United States Patent
Ko et al.

(10) Patent No.: US 11,533,723 B2
(45) Date of Patent: Dec. 20, 2022

(54) METHOD AND DEVICE FOR SIGNALING INFORMATION RELATED TO TDD SLOT CONFIGURATION IN NR V2X

(71) Applicant: LG Electronics Inc., Seoul (KR)

(72) Inventors: Woosuk Ko, Seoul (KR); Hanbyul Seo, Seoul (KR); Seungmin Lee, Seoul (KR); Daesung Hwang, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 17/675,317

(22) Filed: Feb. 18, 2022

(65) Prior Publication Data

US 2022/0174672 A1    Jun. 2, 2022

Related U.S. Application Data

(63) Continuation of application No. PCT/KR2020/013952, filed on Oct. 13, 2020.
(Continued)

(30) Foreign Application Priority Data

Oct. 14, 2019  (KR) .......................... 10-2019-0127350
Oct. 16, 2019  (KR) .......................... 10-2019-0128707
Nov. 7, 2019   (KR) .......................... 10-2019-0141905

(51) Int. Cl.
  *H04W 72/04*   (2009.01)
  *H04L 5/14*    (2006.01)
  *H04W 48/10*   (2009.01)

(52) U.S. Cl.
  CPC ........... *H04W 72/0446* (2013.01); *H04L 5/14* (2013.01); *H04W 48/10* (2013.01)

(58) Field of Classification Search
  None
  See application file for complete search history.

(56) References Cited

U.S. PATENT DOCUMENTS 11,122,530 B2 *  9/2021  Zhang ................... H04W 8/005
2018/0262313 A1   9/2018  Nam et al.
(Continued)

OTHER PUBLICATIONS

CATT, "Sidelink synchronization mechanism in NR V2X," R1-1910330, 3GPP TSG RAN WG1 Meeting #98bis, Chongqing, China, dated Oct. 14-18, 2019, 15 pages.
(Continued)

*Primary Examiner* — Hong S Cho
(74) *Attorney, Agent, or Firm* — Fish & Richardson P.C.

(57) ABSTRACT

A method for performing wireless communication by a first device and a device for supporting same are provided. The method may include receiving information related to a time division duplex (TDD) slot configuration, transmitting, to a second device, a sidelink-synchronization signal block (S-SSB), wherein the S-SSB includes a sidelink primary synchronization signal (S-PSS), a sidelink secondary synchronization signal (S-SSS) and a physical sidelink broadcast channel (PSBCH), and transmitting, to the second device, a physical sidelink shared channel (PSSCH) based on the information related to the TDD slot configuration. For example, candidate resources to which a bitmap related to a sidelink resource pool is applied are configured based on the information related to the TDD slot configuration. For example, the candidate resources include one or more slots. For example, configuration information related to a sidelink symbol included in each of the one or more slots is received. For example, the configuration information related to the sidelink symbol includes information related to a position of the sidelink symbol. For example, the position of the sidelink symbol is configured to be the same for the candidate resources.

15 Claims, 22 Drawing Sheets

Related U.S. Application Data

(60) Provisional application No. 62/914,543, filed on Oct. 13, 2019.

(56) References Cited

U.S. PATENT DOCUMENTS

| | | | |
|---|---|---|---|
| 2019/0069200 A1 | 2/2019 | Zhang et al. | |
| 2019/0149365 A1 | 5/2019 | Chatterjee et al. | |
| 2021/0234663 A1* | 7/2021 | Kim | H04L 27/26025 |

OTHER PUBLICATIONS

ITL, "Physical layer structure for NR V2X," R1-1910796, 3GPP TSG RAN WG1 #98bis, Chongqing, China, dated Oct. 14-20, 2019, 10 pages.

Spreadtrum Communications, "Discussion on physical layer structure for sidelink," R1-1910005, 3GPP TSG RAN WG1 #98bis, Chongqing, China, dated Oct. 14-20, 2019, 16 pages.

Extended European Search Report in European Application No. 20877721.9, dated Jul. 7, 2022, 14 pages.

Huawei et al., "Sidelink synchronization mechanisms for NR V2X," 3GPP TSG RAN WG1 Meeting #98, R1-1908043, Prague, Czech Republic, Aug. 26-30, 2019, 18 pages.

Intel Corporation, "Discussion on Time Resource Pattern of Transmission," 3GPP TSG RAN WG1 Meeting #80, R1-150235, Athens, Greece, Feb. 9-13, 2015, 5 pages.

LG Electronics, "Discussion on NR sidelink synchronization mechanism," 3GPP TSG RAN WG1 #98 Meeting, R1-1908904, Prague, Aug. 26-30, 2019, 18 pages.

NTT Docomo, Inc., "Sidelink synchronization mechanism for NR V2X," 3GPP TSG RAN WG1 #96, R1-1902800, Athens, Greece, Feb. 25-Mar. 1, 2019, 5 pages.

Samsung, "Discussion on physical layer structures for NR V2X," 3GPP TSG RAN WG1 #95, R1-1812984, Spokane, USA, Nov. 12-16, 2018, 10 pages.

ZTE, "Allocation of reserved subframe for V2X resources pool," 3GPP TSG RAN WG1 Meeting #87, R1-1612107, Reno, USA, Nov. 14-18, 2016, 3 pages.

Office Action in Korean Appln. No. 10-2022-7005828, dated Oct. 28, 2022, 10 pages (with English translation).

Samsung, "On physical layer structures for NR V2X," R1-1910469, Presented at 3GPP TSG RAN WG1 #98bis Meeting, Chongqing, China, Oct. 14-20, 2019, 13 pages.

* cited by examiner

FIG. 4
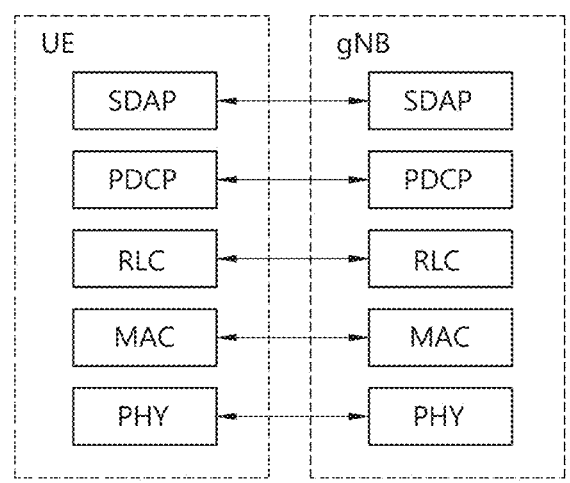
(a)
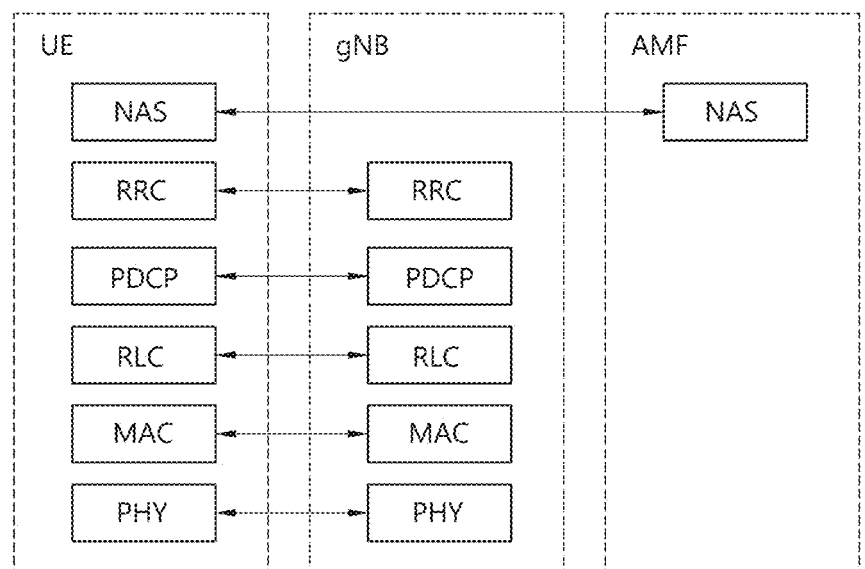
(b)

FIG. 8
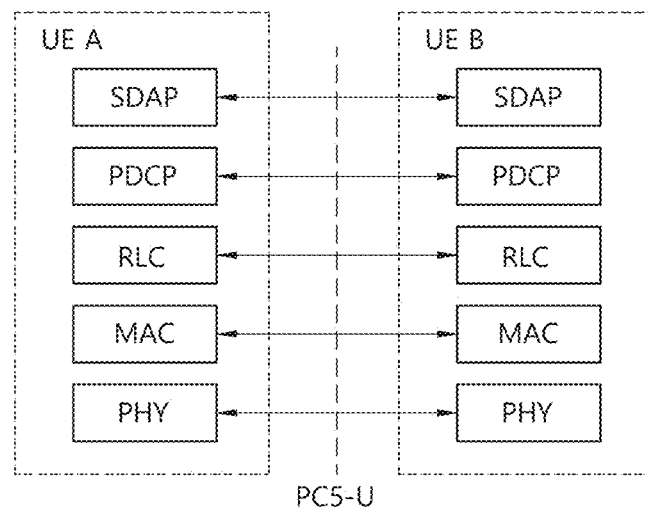
(a)
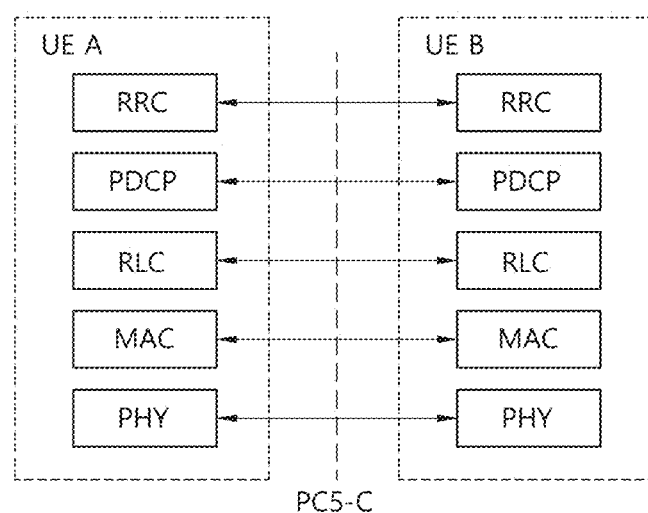
(b)

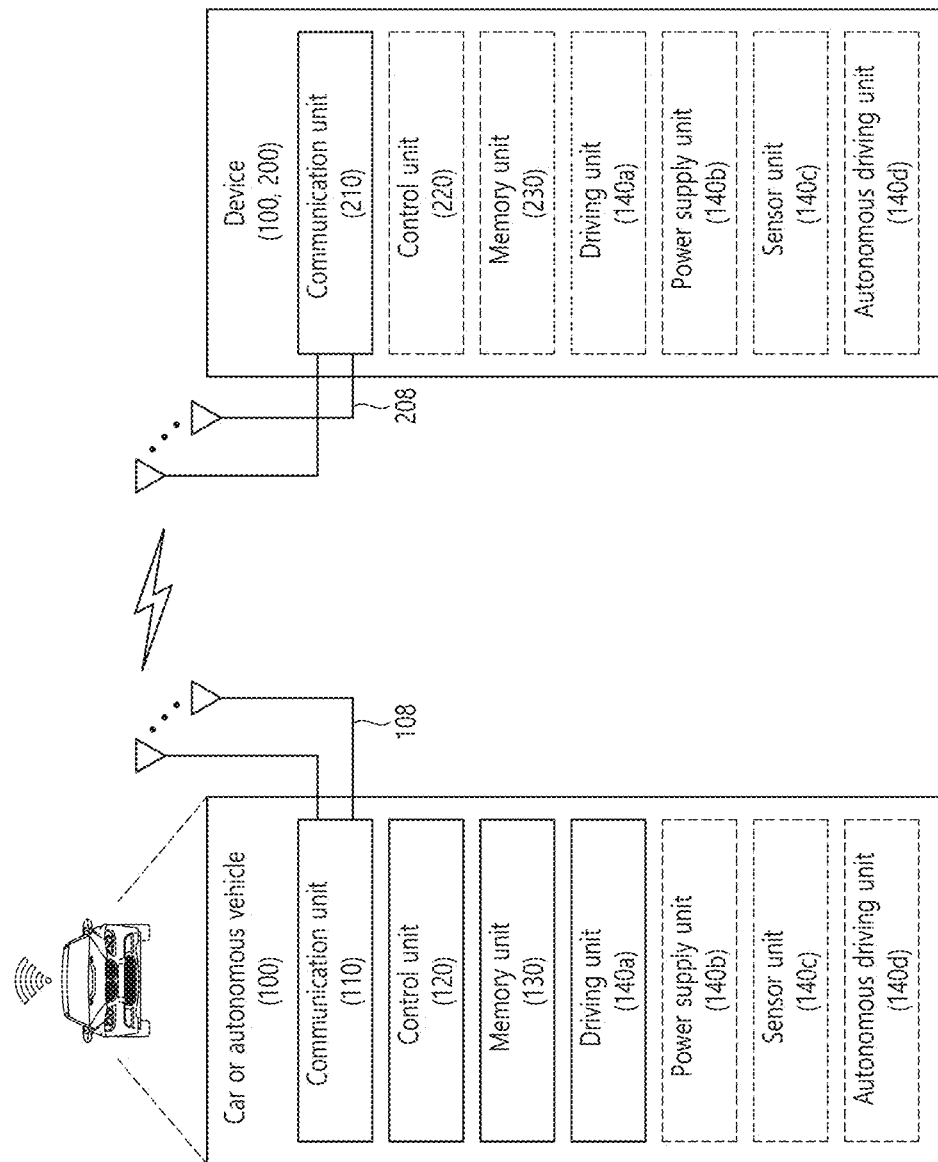

METHOD AND DEVICE FOR SIGNALING INFORMATION RELATED TO TDD SLOT CONFIGURATION IN NR V2X

CROSS-REFERENCE TO RELATED APPLICATIONS

Pursuant to 35 U.S.C. § 119(e), this application is a continuation of International Application PCT/KR2020/013952, with an international filing date of Oct. 13, 2020, which claims the benefit of U.S. Provisional Patent Application No. 62/914,543, filed on Oct. 13, 2019, Korean Patent Application No. 10-2019-0127350, filed on Oct. 14, 2019, Korean Patent Application No. 10-2019-0128707, filed on Oct. 16, 2019 and Korean Patent Application No. 10-2019-0141905, filed on Nov. 7, 2019, the contents of which are hereby incorporated by reference herein in their entirety.

BACKGROUND OF THE DISCLOSURE

Field of the Disclosure

This disclosure relates to a wireless communication system.

Related Art

Sidelink (SL) communication is a communication scheme in which a direct link is established between User Equipments (UEs) and the UEs exchange voice and data directly with each other without intervention of an evolved Node B (eNB). SL communication is under consideration as a solution to the overhead of an eNB caused by rapidly increasing data traffic.

Vehicle-to-everything (V2X) refers to a communication technology through which a vehicle exchanges information with another vehicle, a pedestrian, an object having an infrastructure (or infra) established therein, and so on. The V2X may be divided into 4 types, such as vehicle-to-vehicle (V2V), vehicle-to-infrastructure (V2I), vehicle-to-network (V2N), and vehicle-to-pedestrian (V2P). The V2X communication may be provided via a PC5 interface and/or Uu interface.

Meanwhile, as a wider range of communication devices require larger communication capacities, the need for mobile broadband communication that is more enhanced than the existing Radio Access Technology (RAT) is rising. Accordingly, discussions are made on services and user equipment (UE) that are sensitive to reliability and latency. And, a next generation radio access technology that is based on the enhanced mobile broadband communication, massive Machine Type Communication (MTC), Ultra-Reliable and Low Latency Communication (URLLC), and so on, may be referred to as a new radio access technology (RAT) or new radio (NR). Herein, the NR may also support vehicle-to-everything (V2X) communication.

FIG. 1 is a drawing for describing V2X communication based on NR, compared to V2X communication based on RAT used before NR. The embodiment of FIG. 1 may be combined with various embodiments of the present disclosure.

Regarding V2X communication, a scheme of providing a safety service, based on a V2X message such as Basic Safety Message (BSM), Cooperative Awareness Message (CAM), and Decentralized Environmental Notification Message (DENM) is focused in the discussion on the RAT used before the NR. The V2X message may include position information, dynamic information, attribute information, or the like. For example, a UE may transmit a periodic message type CAM and/or an event triggered message type DENM to another UE.

For example, the CAM may include dynamic state information of the vehicle such as direction and speed, static data of the vehicle such as a size, and basic vehicle information such as an exterior illumination state, route details, or the like. For example, the UE may broadcast the CAM, and latency of the CAM may be less than 100 ms. For example, the UE may generate the DENM and transmit it to another UE in an unexpected situation such as a vehicle breakdown, accident, or the like. For example, all vehicles within a transmission range of the UE may receive the CAM and/or the DENM. In this case, the DENM may have a higher priority than the CAM.

Thereafter, regarding V2X communication, various V2X scenarios are proposed in NR. For example, the various V2X scenarios may include vehicle platooning, advanced driving, extended sensors, remote driving, or the like.

For example, based on the vehicle platooning, vehicles may move together by dynamically forming a group. For example, in order to perform platoon operations based on the vehicle platooning, the vehicles belonging to the group may receive periodic data from a leading vehicle. For example, the vehicles belonging to the group may decrease or increase an interval between the vehicles by using the periodic data.

For example, based on the advanced driving, the vehicle may be semi-automated or fully automated. For example, each vehicle may adjust trajectories or maneuvers, based on data obtained from a local sensor of a proximity vehicle and/or a proximity logical entity. In addition, for example, each vehicle may share driving intention with proximity vehicles.

For example, based on the extended sensors, raw data, processed data, or live video data obtained through the local sensors may be exchanged between a vehicle, a logical entity, a UE of pedestrians, and/or a V2X application server. Therefore, for example, the vehicle may recognize a more improved environment than an environment in which a self-sensor is used for detection.

For example, based on the remote driving, for a person who cannot drive or a remote vehicle in a dangerous environment, a remote driver or a V2X application may operate or control the remote vehicle. For example, if a route is predictable such as public transportation, cloud computing based driving may be used for the operation or control of the remote vehicle. In addition, for example, an access for a cloud-based back-end service platform may be considered for the remote driving.

Meanwhile, a scheme of specifying service requirements for various V2X scenarios such as vehicle platooning, advanced driving, extended sensors, remote driving, or the like is discussed in NR-based V2X communication.

SUMMARY OF THE DISCLOSURE

Technical Objects

Meanwhile, when the UE performs sidelink communication based on a time division duplex (TDD) operation, the base station may allocate some of uplink (UL) slots/symbols, flexible slots/symbols, or downlink (DL) slots/symbols as sidelink slots/symbols. In this case, for example, in-coverage (INC) UEs may directly receive information related to configuration of a TDD slot corresponding to a UL slot/symbol, a flexible slot/symbol, a DL slot/symbol, or a sidelink slot/symbol among all resources from the base station. Out-of-coverage (OOC) UEs may determine a sidelink slot/symbol based on information related to pre-configured TDD slot configuration, and OOC UEs may perform sidelink communication. Therefore, when the base station reconfigures information related to the TDD slot configuration, which is different from the information related to the pre-configured TDD slot configuration, since information related to the TDD slot configuration is different between the INC UE and the OOC UE, sidelink communication between the INC UE and the OOC UE may be difficult.

Technical Solutions

According to an embodiment of the present disclosure, there is provided a method of performing wireless communication by a first device. The method may include receiving information related to a time division duplex (TDD) slot configuration, transmitting, to a second device, a sidelink-synchronization signal block (S-SSB), wherein the S-SSB includes a sidelink primary synchronization signal (S-PSS), a sidelink secondary synchronization signal (S-SSS) and a physical sidelink broadcast channel (PSBCH), and transmitting, to the second device, a physical sidelink shared channel (PSSCH) based on the information related to the TDD slot configuration. For example, candidate resources to which a bitmap related to a sidelink resource pool is applied are configured based on the information related to the TDD slot configuration. For example, the candidate resources include one or more slots. For example, configuration information related to a sidelink symbol included in each of the one or more slots is received. For example, the configuration information related to the sidelink symbol includes information related to a position of the sidelink symbol. For example, the position of the sidelink symbol is configured to be the same for the candidate resources.

Effects of the Disclosure

A UE may effectively perform sidelink communication.

BRIEF DESCRIPTION OF THE DRAWINGS

FIG. 4 shows a radio protocol architecture, in accordance with an embodiment of the present disclosure.

FIG. 8 shows a radio protocol architecture for a SL communication, in accordance with an embodiment of the present disclosure.

FIG. 22 shows a car or an autonomous vehicle, in accordance with an embodiment of the present disclosure.

DESCRIPTION OF EXEMPLARY EMBODIMENTS

Figure 1:
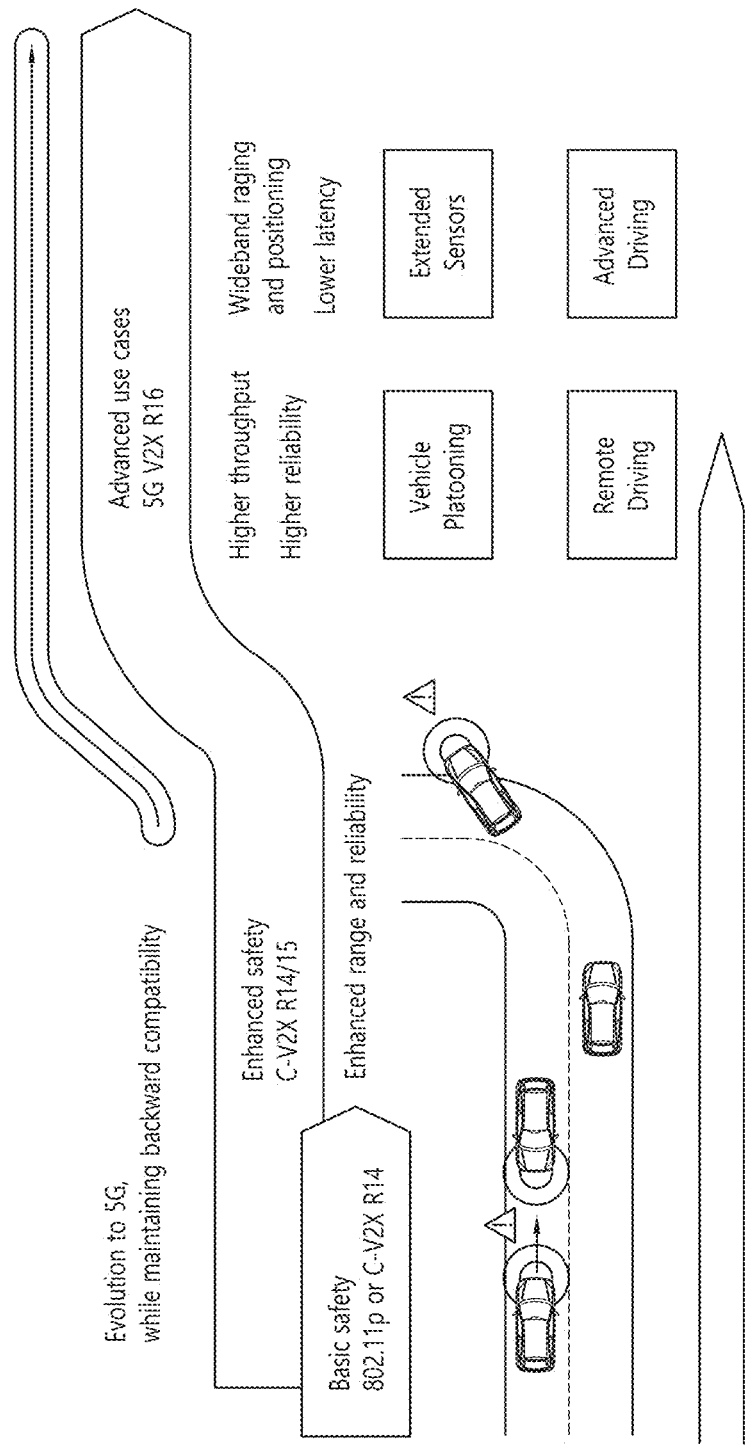
FIG. 1 is a drawing for describing V2X communication based on NR, compared to V2X communication based on RAT used before NR.

In the present specification, "A or B" may mean "only A", "only B" or "both A and B." In other words, in the present specification, "A or B" may be interpreted as "A and/or B". For example, in the present specification, "A, B, or C" may mean "only A", "only B", "only C", or "any combination of A, B, C".

A slash (/) or comma used in the present specification may mean "and/or". For example, "A/B" may mean "A and/or B". Accordingly, "A/B" may mean "only A", "only B", or "both A and B". For example, "A, B, C" may mean "A, B, or C".

In the present specification, "at least one of A and B" may mean "only A", "only B", or "both A and B". In addition, in the present specification, the expression "at least one of A or B" or "at least one of A and/or B" may be interpreted as "at least one of A and B".

In addition, in the present specification, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present specification may mean "for example". Specifically, when indicated as "control information (PDCCH)", it may mean that "PDCCH" is proposed as an example of the "control information". In other words, the "control information" of the present specification is not limited to "PDCCH", and "PDDCH" may be proposed as an example of the "control information". In addition, when indicated as "control information (i.e., PDCCH)", it may also mean that "PDCCH" is proposed as an example of the "control information".

A technical feature described individually in one figure in the present specification may be individually implemented, or may be simultaneously implemented.

The technology described below may be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), and so on. The CDMA may be implemented with a radio technology, such as universal terrestrial radio access (UTRA) or CDMA-2000. The TDMA may be implemented with a radio technology, such as global system for mobile communications (GSM)/general packet ratio service (GPRS)/enhanced data rate for GSM evolution (EDGE). The OFDMA may be implemented with a radio technology, such as institute of electrical and electronics engineers (IEEE) 802.11 (Wi-Fi), IEEE 802.16 (WiMAX), IEEE 802.20, evolved UTRA (E-UTRA), and so on. IEEE 802.16m is an evolved version of IEEE 802.16e and provides backward compatibility with a system based on the IEEE 802.16e. The UTRA is part of a universal mobile telecommunication system (UMTS). 3rd generation partnership project (3GPP) long term evolution (LTE) is part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

5G NR is a successive technology of LTE-A corresponding to a new Clean-slate type mobile communication system having the characteristics of high performance, low latency, high availability, and so on. 5G NR may use resources of all spectrum available for usage including low frequency bands of less than 1 GHz, middle frequency bands ranging from 1 GHz to 10 GHz, high frequency (millimeter waves) of 24 GHz or more, and so on.

For clarity in the description, the following description will mostly focus on LTE-A or 5G NR. However, technical features according to an embodiment of the present disclosure will not be limited only to this.

Figure 2:
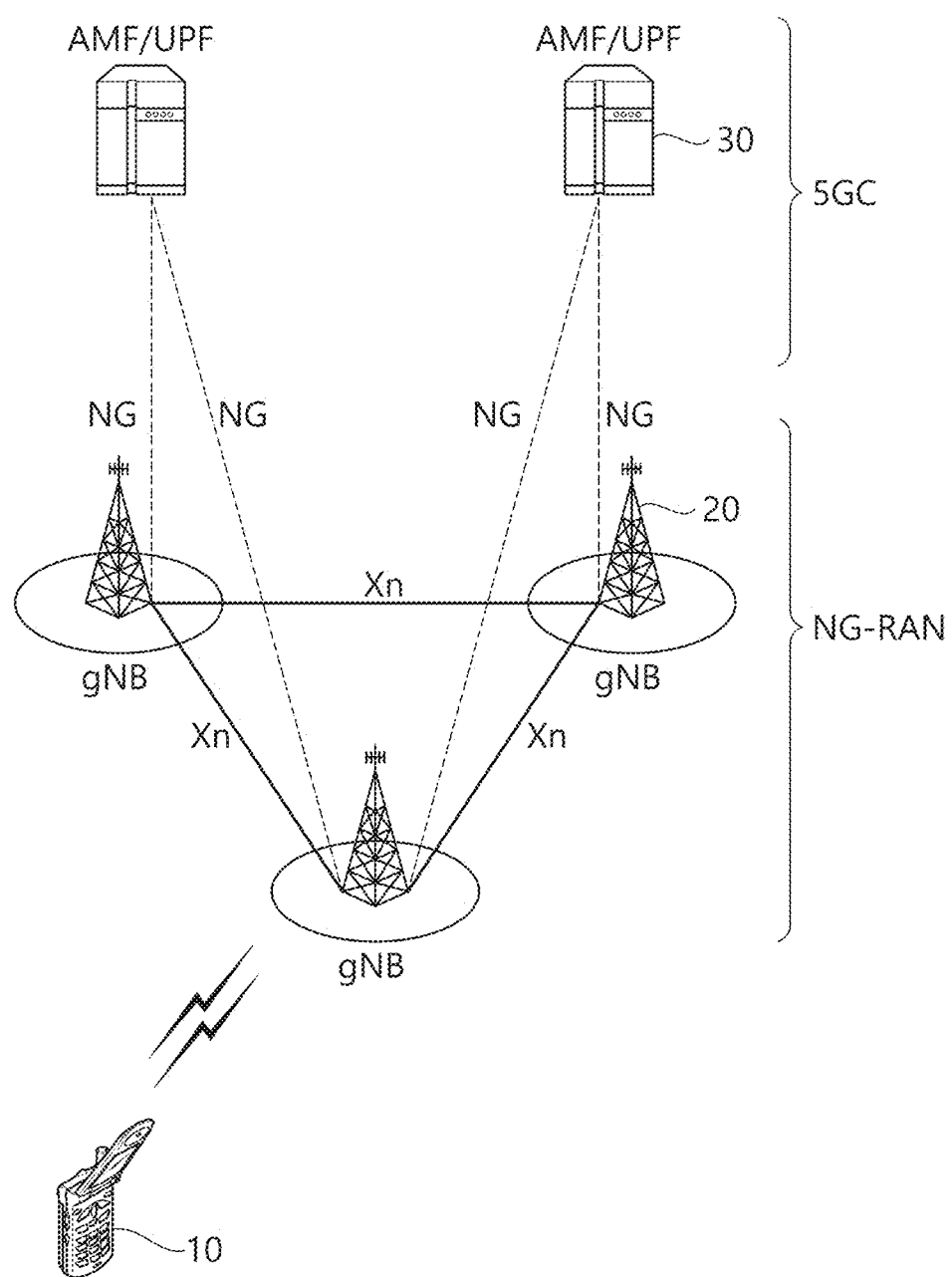
FIG. 2 shows a structure of an NR system, in accordance with an embodiment of the present disclosure.

FIG. 2 shows a structure of an NR system, in accordance with an embodiment of the present disclosure. The embodiment of FIG. 2 may be combined with various embodiments of the present disclosure.

Referring to FIG. 2, a next generation-radio access network (NG-RAN) may include a BS 20 providing a UE 10 with a user plane and control plane protocol termination. For example, the BS 20 may include a next generation-Node B (gNB) and/or an evolved-NodeB (eNB). For example, the UE 10 may be fixed or mobile and may be referred to as other terms, such as a mobile station (MS), a user terminal (UT), a subscriber station (SS), a mobile terminal (MT), wireless device, and so on. For example, the BS may be referred to as a fixed station which communicates with the UE 10 and may be referred to as other terms, such as a base transceiver system (BTS), an access point (AP), and so on.

The embodiment of FIG. 2 exemplifies a case where only the gNB is included. The BSs 20 may be connected to one another via Xn interface. The BS 20 may be connected to one another via 5th generation (5G) core network (5GC) and NG interface. More specifically, the BSs 20 may be connected to an access and mobility management function (AMF) 30 via NG-C interface, and may be connected to a user plane function (UPF) 30 via NG-U interface.

Figure 3:
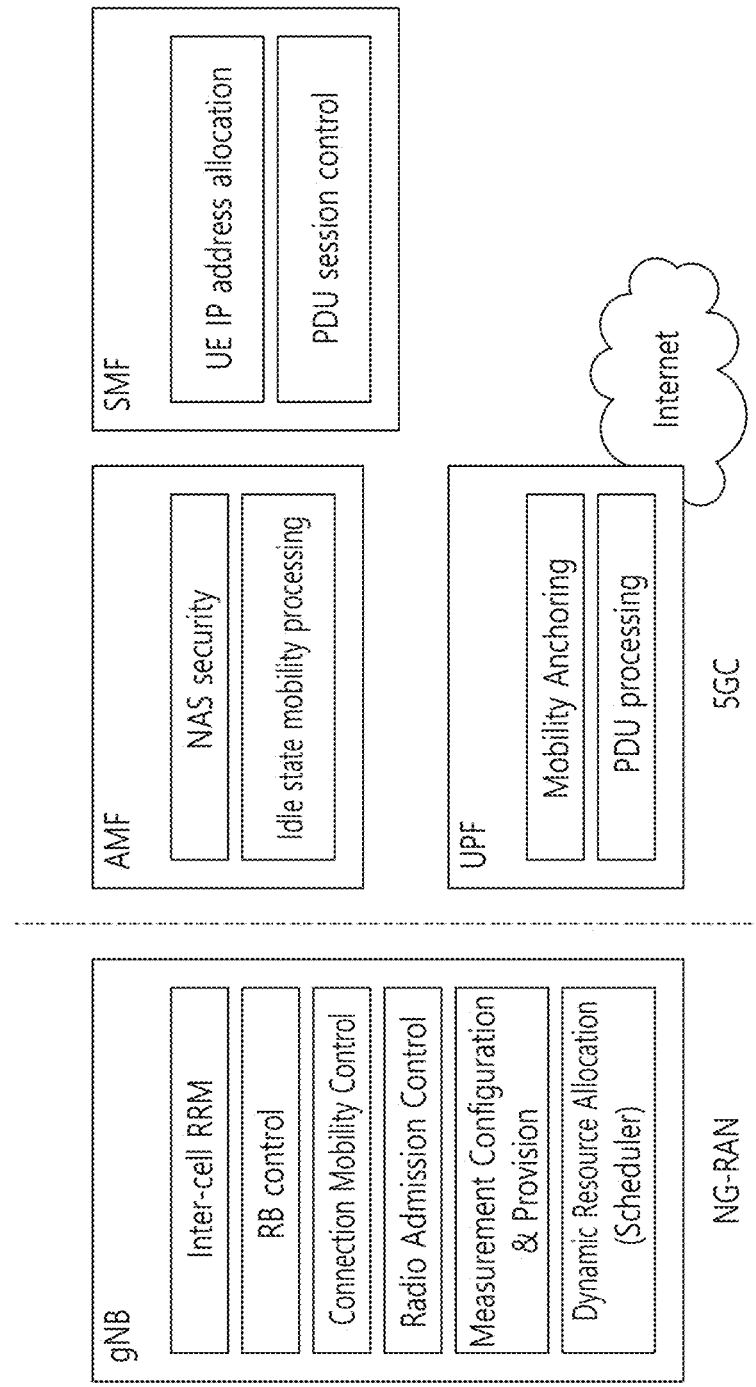
FIG. 3 shows a functional division between an NG-RAN and a 5GC, in accordance with an embodiment of the present disclosure.

FIG. 3 shows a functional division between an NG-RAN and a 5GC, in accordance with an embodiment of the present disclosure.

Referring to FIG. 3, the gNB may provide functions, such as Inter Cell Radio Resource Management (RRM), Radio Bearer (RB) control, Connection Mobility Control, Radio Admission Control, Measurement Configuration & Provision, Dynamic Resource Allocation, and so on. An AMF may provide functions, such as Non Access Stratum (NAS) security, idle state mobility processing, and so on. A UPF may provide functions, such as Mobility Anchoring, Protocol Data Unit (PDU) processing, and so on. A Session Management Function (SMF) may provide functions, such as user equipment (UE) Internet Protocol (IP) address allocation, PDU session control, and so on.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

FIG. 4 shows a radio protocol architecture, in accordance with an embodiment of the present disclosure. The embodiment of FIG. 4 may be combined with various embodiments of the present disclosure. Specifically, FIG. 4(a) shows a radio protocol architecture for a user plane, and FIG. 4(b) shows a radio protocol architecture for a control plane. The user plane corresponds to a protocol stack for user data transmission, and the control plane corresponds to a protocol stack for control signal transmission.

Referring to FIG. 4, a physical layer provides an upper layer with an information transfer service through a physical channel. The physical layer is connected to a medium access control (MAC) layer which is an upper layer of the physical layer through a transport channel. Data is transferred between the MAC layer and the physical layer through the transport channel. The transport channel is classified according to how and with what characteristics data is transmitted through a radio interface.

Between different physical layers, i.e., a physical layer of a transmitter and a physical layer of a receiver, data are transferred through the physical channel. The physical channel is modulated using an orthogonal frequency division multiplexing (OFDM) scheme, and utilizes time and frequency as a radio resource.

The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. The MAC layer provides data transfer services over logical channels.

The RLC layer performs concatenation, segmentation, and reassembly of Radio Link Control Service Data Unit (RLC SDU). In order to ensure diverse quality of service (QoS) required by a radio bearer (RB), the RLC layer provides three types of operation modes, i.e., a transparent mode (TM), an unacknowledged mode (UM), and an acknowledged mode (AM). An AM RLC provides error correction through an automatic repeat request (ARQ).

A radio resource control (RRC) layer is defined only in the control plane. The RRC layer serves to control the logical channel, the transport channel, and the physical channel in association with configuration, reconfiguration and release of RBs. The RB is a logical path provided by the first layer (i.e., the physical layer or the PHY layer) and the second layer (i.e., the MAC layer, the RLC layer, and the packet data convergence protocol (PDCP) layer) for data delivery between the UE and the network.

Functions of a packet data convergence protocol (PDCP) layer in the user plane include user data delivery, header compression, and ciphering. Functions of a PDCP layer in the control plane include control-plane data delivery and ciphering/integrity protection.

A service data adaptation protocol (SDAP) layer is defined only in a user plane. The SDAP layer performs mapping between a Quality of Service (QoS) flow and a data radio bearer (DRB) and QoS flow ID (QFI) marking in both DL and UL packets.

The configuration of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection is established between an RRC layer of the UE and an RRC layer of the E-UTRAN, the UE is in an RRC_CONNECTED state, and, otherwise, the UE may be in an RRC_IDLE state. In case of the NR, an RRC_INACTIVE state is additionally defined, and a UE being in the RRC_INACTIVE state may maintain its connection with a core network whereas its connection with the BS is released.

Data is transmitted from the network to the UE through a downlink transport channel. Examples of the downlink transport channel include a broadcast channel (BCH) for transmitting system information and a downlink-shared channel (SCH) for transmitting user traffic or control messages. Traffic of downlink multicast or broadcast services or the control messages can be transmitted on the downlink-SCH or an additional downlink multicast channel (MCH). Data is transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

The physical channel includes several OFDM symbols in a time domain and several sub-carriers in a frequency domain. One sub-frame includes a plurality of OFDM symbols in the time domain. A resource block is a unit of resource allocation, and consists of a plurality of OFDM symbols and a plurality of sub-carriers. Further, each sub-frame may use specific sub-carriers of specific OFDM symbols (e.g., a first OFDM symbol) of a corresponding subframe for a physical downlink control channel (PDCCH), i.e., an L1/L2 control channel. A transmission time interval (TTI) is a unit time of subframe transmission.

Figure 5:
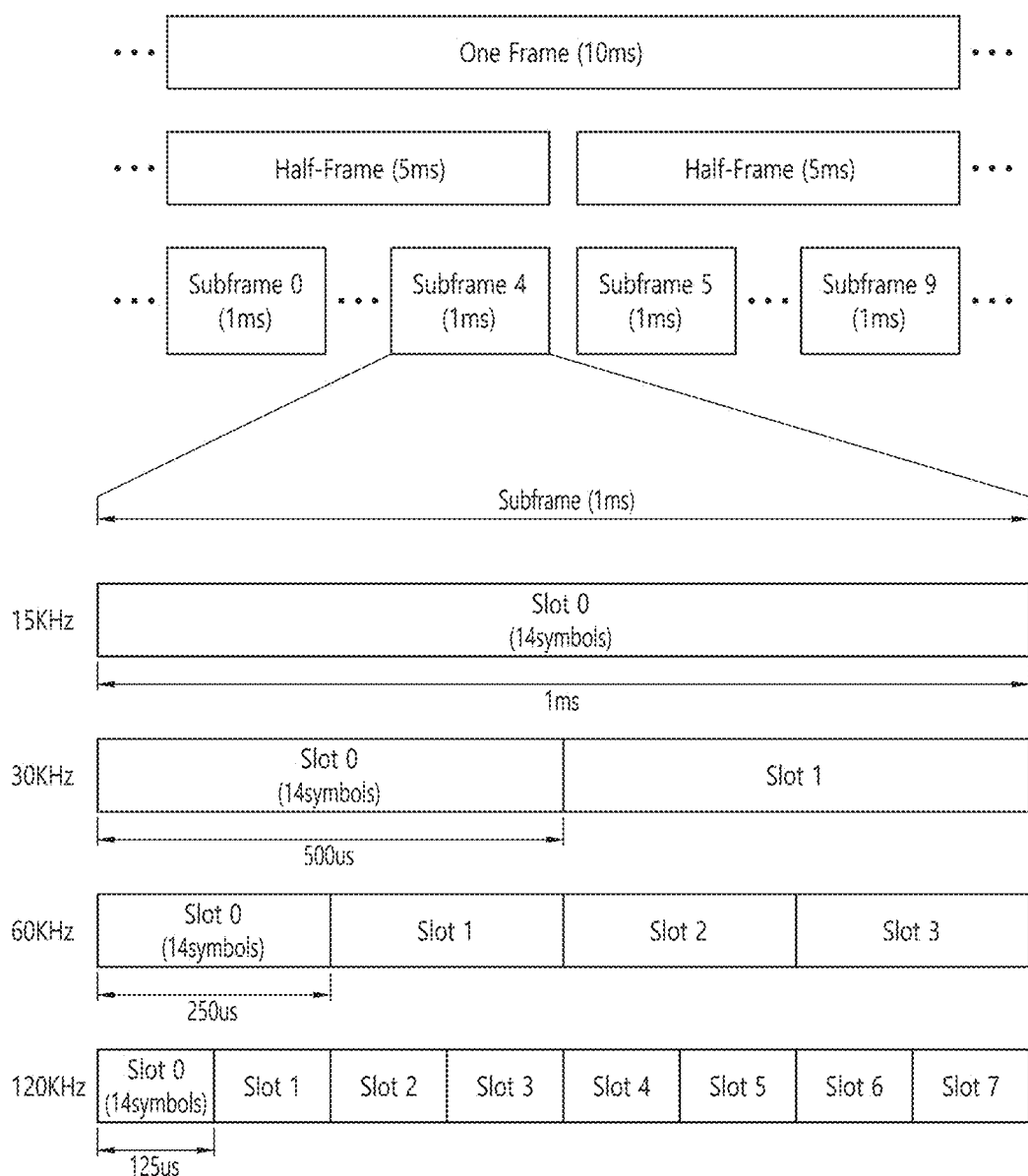
FIG. 5 shows a structure of an NR system, in accordance with an embodiment of the present disclosure.

FIG. 5 shows a structure of an NR system, in accordance with an embodiment of the present disclosure. The embodiment of FIG. 5 may be combined with various embodiments of the present disclosure.

Referring to FIG. 5, in the NR, a radio frame may be used for performing uplink and downlink transmission. A radio frame has a length of 10 ms and may be defined to be configured of two half-frames (HFs). A half-frame may include five 1ms subframes (SFs). A subframe (SF) may be divided into one or more slots, and the number of slots within a subframe may be determined in accordance with subcarrier spacing (SCS). Each slot may include 12 or 14 OFDM(A) symbols according to a cyclic prefix (CP).

In case of using a normal CP, each slot may include 14 symbols. In case of using an extended CP, each slot may include 12 symbols. Herein, a symbol may include an OFDM symbol (or CP-OFDM symbol) and a Single Carrier-FDMA (SC-FDMA) symbol (or Discrete Fourier Transform-spread-OFDM (DFT-s-OFDM) symbol).

Table 1 shown below represents an example of a number of symbols per slot ($N^{slot}_{symb}$), a number slots per frame ($N^{frame,u}_{slot}$), and a number of slots per subframe ($N^{subframe,u}_{slot}$) based on an SCS configuration (u), in a case where a normal CP is used.

TABLE 1

| SCS (15*2$^u$) | $N^{slot}_{symb}$ | $N^{frame,u}_{slot}$ | $N^{subframe,u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

Table 2 shows an example of a number of symbols per slot, a number of slots per frame, and a number of slots per subframe in accordance with the SCS, in a case where an extended CP is used.

TABLE 2

| SCS (15 * 2$^u$) | $N^{slot}_{symb}$ | $N^{frame,u}_{slot}$ | $N^{subframe,u}_{slot}$ |
|---|---|---|---|
| 60 KHz (u = 2) | 12 | 40 | 4 |

In an NR system, OFDM(A) numerologies (e.g., SCS, CP length, and so on) between multiple cells being integrate to one UE may be differently configured. Accordingly, a (absolute time) duration (or section) of a time resource (e.g., subframe, slot or TTI) (collectively referred to as a time unit (TU) for simplicity) being configured of the same number of symbols may be differently configured in the integrated cells.

In the NR, multiple numerologies or SCSs for supporting diverse 5G services may be supported. For example, in case an SCS is 15 kHz, a wide area of the conventional cellular bands may be supported, and, in case an SCS is 30 kHz/60 kHz a dense-urban, lower latency, wider carrier bandwidth may be supported. In case the SCS is 60 kHz or higher, a bandwidth that is greater than 24.25 GHz may be used in order to overcome phase noise.

An NR frequency band may be defined as two different types of frequency ranges. The two different types of frequency ranges may be FR1 and FR2. The values of the frequency ranges may be changed (or varied), and, for example, the two different types of frequency ranges may be as shown below in Table 3. Among the frequency ranges that are used in an NR system, FR1 may mean a "sub 6 GHz range", and FR2 may mean an "above 6 GHz range" and may also be referred to as a millimeter wave (mmW).

TABLE 3

| Frequency Range designation | Corresponding frequency range | Subcarrier Spacing (SCS) |
| --- | --- | --- |
| FR1 | 450 MHz-6000 MHz | 15, 30, 60 kHz |
| FR2 | 24250 MHz-52600 MHz | 60, 120, 240 kHz |

As described above, the values of the frequency ranges in the NR system may be changed (or varied). For example, as shown below in Table 4, FR1 may include a band within a range of 410 MHz to 7125 MHz. More specifically, FR1 may include a frequency band of 6 GHz (or 5850, 5900, 5925 MHz, and so on) and higher. For example, a frequency band of 6 GHz (or 5850, 5900, 5925 MHz, and so on) and higher being included in FR1 mat include an unlicensed band. The unlicensed band may be used for diverse purposes, e.g., the unlicensed band for vehicle-specific communication (e.g., automated driving).

TABLE 4

| Frequency Range designation | Corresponding frequency range | Subcarrier Spacing (SCS) |
| --- | --- | --- |
| FR1 | 410 MHz-7125 MHz | 15, 30, 60 kHz |
| FR2 | 24250 MHz-52600 MHz | 60, 120, 240 kHz |

Figure 6:
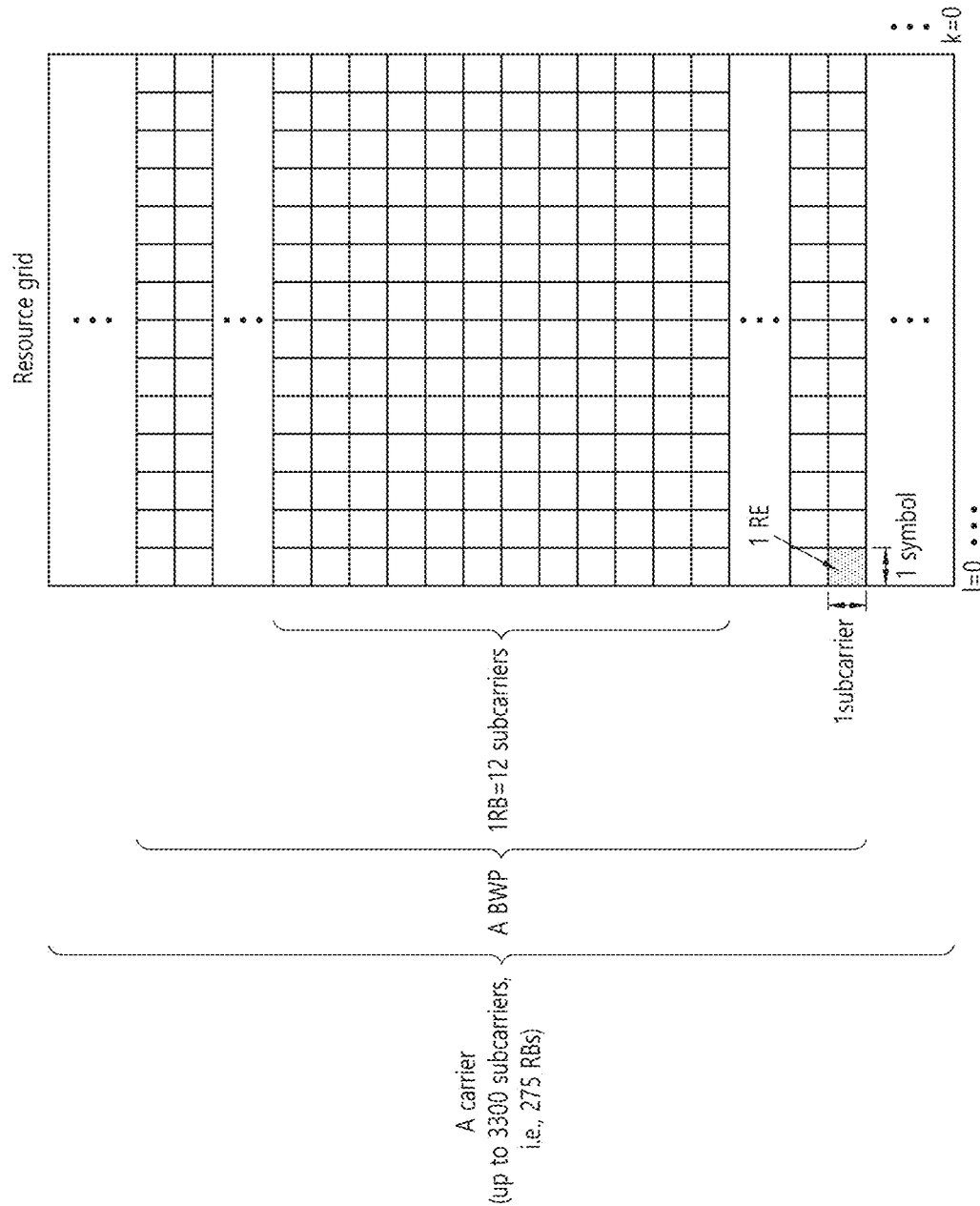
FIG. 6 shows a structure of a slot of an NR frame, in accordance with an embodiment of the present disclosure.

FIG. 6 shows a structure of a slot of an NR frame, in accordance with an embodiment of the present disclosure.

Referring to FIG. 6, a slot includes a plurality of symbols in a time domain. For example, in case of a normal CP, one slot may include 14 symbols. However, in case of an extended CP, one slot may include 12 symbols. Alternatively, in case of a normal CP, one slot may include 7 symbols. However, in case of an extended CP, one slot may include 6 symbols.

A carrier includes a plurality of subcarriers in a frequency domain. A Resource Block (RB) may be defined as a plurality of consecutive subcarriers (e.g., 12 subcarriers) in the frequency domain. A Bandwidth Part (BWP) may be defined as a plurality of consecutive (Physical) Resource Blocks ((P)RBs) in the frequency domain, and the BWP may correspond to one numerology (e.g., SCS, CP length, and so on). A carrier may include a maximum of N number BWPs (e.g., 5 BWPs). Data communication may be performed via an activated BWP. Each element may be referred to as a Resource Element (RE) within a resource grid and one complex symbol may be mapped to each element.

Meanwhile, a radio interface between a UE and another UE or a radio interface between the UE and a network may consist of an L1 layer, an L2 layer, and an L3 layer. In various embodiments of the present disclosure, the L1 layer may imply a physical layer. In addition, for example, the L2 layer may imply at least one of a MAC layer, an RLC layer, a PDCP layer, and an SDAP layer. In addition, for example, the L3 layer may imply an RRC layer.

Hereinafter, a bandwidth part (BWP) and a carrier will be described.

The BWP may be a set of consecutive physical resource blocks (PRBs) in a given numerology. The PRB may be selected from consecutive sub-sets of common resource blocks (CRBs) for the given numerology on a given carrier.

When using bandwidth adaptation (BA), a reception bandwidth and transmission bandwidth of a UE are not necessarily as large as a bandwidth of a cell, and the reception bandwidth and transmission bandwidth of the BS may be adjusted. For example, a network/BS may inform the UE of bandwidth adjustment. For example, the UE receive information/configuration for bandwidth adjustment from the network/BS. In this case, the UE may perform bandwidth adjustment based on the received information/configuration. For example, the bandwidth adjustment may include an increase/decrease of the bandwidth, a position change of the bandwidth, or a change in subcarrier spacing of the bandwidth.

For example, the bandwidth may be decreased during a period in which activity is low to save power. For example, the position of the bandwidth may move in a frequency domain. For example, the position of the bandwidth may move in the frequency domain to increase scheduling flexibility. For example, the subcarrier spacing of the bandwidth may be changed. For example, the subcarrier spacing of the bandwidth may be changed to allow a different service. A subset of a total cell bandwidth of a cell may be called a bandwidth part (BWP). The BA may be performed when the BS/network configures the BWP to the UE and the BS/network informs the UE of the BWP currently in an active state among the configured BWPs.

For example, the BWP may be at least any one of an active BWP, an initial BWP, and/or a default BWP. For example, the UE may not monitor downlink radio link quality in a DL BWP other than an active DL BWP on a primary cell (PCell). For example, the UE may not receive PDCCH, PDSCH, or CSI-RS (excluding RRM) outside the active DL BWP. For example, the UE may not trigger a channel state information (CSI) report for the inactive DL BWP. For example, the UE may not transmit PUCCH or PUSCH outside an active UL BWP. For example, in a downlink case, the initial BWP may be given as a consecutive RB set for an RMSI CORESET (configured by PBCH). For example, in an uplink case, the initial BWP may be given by SIB for a random access procedure. For example, the default BWP may be configured by a higher layer. For example, an initial value of the default BWP may be an initial DL BWP. For energy saving, if the UE fails to detect DCI during a specific period, the UE may switch the active BWP of the UE to the default BWP.

Meanwhile, the BWP may be defined for SL. The same SL BWP may be used in transmission and reception. For example, a transmitting UE may transmit an SL channel or an SL signal on a specific BWP, and a receiving UE may receive the SL channel or the SL signal on the specific BWP. In a licensed carrier, the SL BWP may be defined separately from a Uu BWP, and the SL BWP may have configuration signaling separate from the Uu BWP. For example, the UE may receive a configuration for the SL BWP from the BS/network. The SL BWP may be (pre-)configured in a carrier with respect to an out-of-coverage NR V2X UE and an RRC_IDLE UE. For the UE in the RRC_CONNECTED mode, at least one SL BWP may be activated in the carrier.

Figure 7:
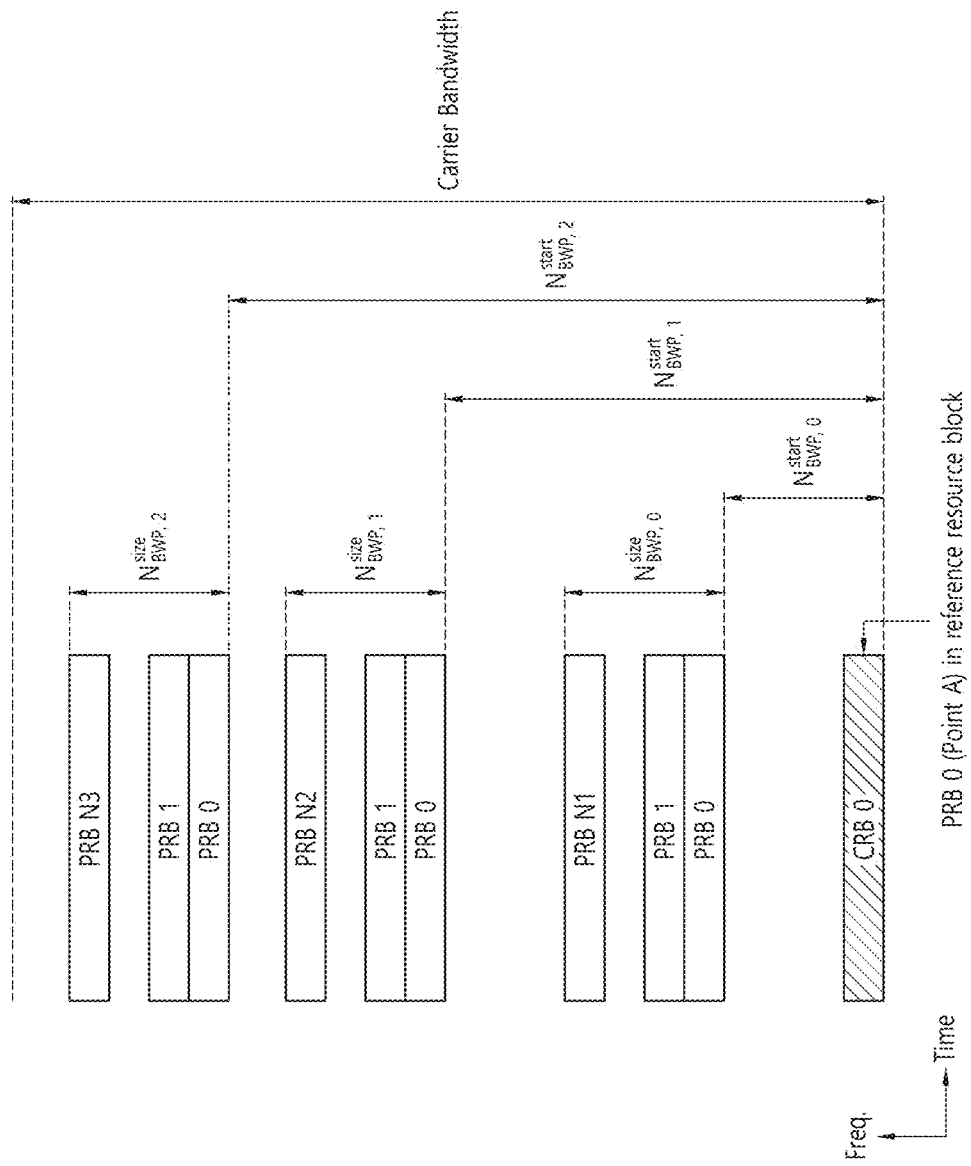
FIG. 7 shows an example of a BWP, in accordance with an embodiment of the present disclosure.

FIG. 7 shows an example of a BWP, in accordance with an embodiment of the present disclosure. The embodiment of FIG. 7 may be combined with various embodiments of the present disclosure. It is assumed in the embodiment of FIG. 7 that the number of BWPs is 3.

Referring to FIG. 7, a common resource block (CRB) may be a carrier resource block numbered from one end of a carrier band to the other end thereof. In addition, the PRB may be a resource block numbered within each BWP. A point A may indicate a common reference point for a resource block grid.

The BWP may be configured by a point A, an offset $N^{start}_{BWP}$ from the point A, and a bandwidth $N^{size}_{BWP}$. For example, the point A may be an external reference point of a PRB of a carrier in which a subcarrier 0 of all numerologies (e.g., all numerologies supported by a network on that carrier) is aligned. For example, the offset may be a PRB interval between a lowest subcarrier and the point A in a given numerology. For example, the bandwidth may be the number of PRBs in the given numerology.

Hereinafter, V2X or SL communication will be described.

FIG. 8 shows a radio protocol architecture for a SL communication, in accordance with an embodiment of the present disclosure. The embodiment of FIG. 8 may be combined with various embodiments of the present disclosure. More specifically, FIG. 8(a) shows a user plane protocol stack, and FIG. 8(b) shows a control plane protocol stack.

Hereinafter, a sidelink synchronization signal (SLSS) and synchronization information will be described.

The SLSS may include a primary sidelink synchronization signal (PSSS) and a secondary sidelink synchronization signal (SSSS), as an SL-specific sequence. The PSSS may be referred to as a sidelink primary synchronization signal (S-PSS), and the SSSS may be referred to as a sidelink secondary synchronization signal (S-SSS). For example, length-127 M-sequences may be used for the S-PSS, and length-127 gold sequences may be used for the S-SSS. For example, a UE may use the S-PSS for initial signal detection and for synchronization acquisition. For example, the UE may use the S-PSS and the S-SSS for acquisition of detailed synchronization and for detection of a synchronization signal ID.

A physical sidelink broadcast channel (PSBCH) may be a (broadcast) channel for transmitting default (system) information which must be first known by the UE before SL signal transmission/reception. For example, the default information may be information related to SLSS, a duplex mode (DM), a time division duplex (TDD) uplink/downlink (UL/DL) configuration, information related to a resource pool, a type of an application related to the SLSS, a subframe offset, broadcast information, or the like. For example, for evaluation of PSBCH performance, in NR V2X, a payload size of the PSBCH may be 56 bits including 24-bit CRC.

The S-PSS, the S-SSS, and the PSBCH may be included in a block format (e.g., SL synchronization signal (SS)/PSBCH block, hereinafter, sidelink-synchronization signal block (S-SSB)) supporting periodical transmission. The S-SSB may have the same numerology (i.e., SCS and CP length) as a physical sidelink control channel (PSCCH)/physical sidelink shared channel (PSSCH) in a carrier, and a transmission bandwidth may exist within a (pre-)configured sidelink (SL) BWP. For example, the S-SSB may have a bandwidth of 11 resource blocks (RBs). For example, the PSBCH may exist across 11 RBs. In addition, a frequency position of the S-SSB may be (pre-)configured. Accordingly, the UE does not have to perform hypothesis detection at frequency to discover the S-SSB in the carrier.

Figure 9:
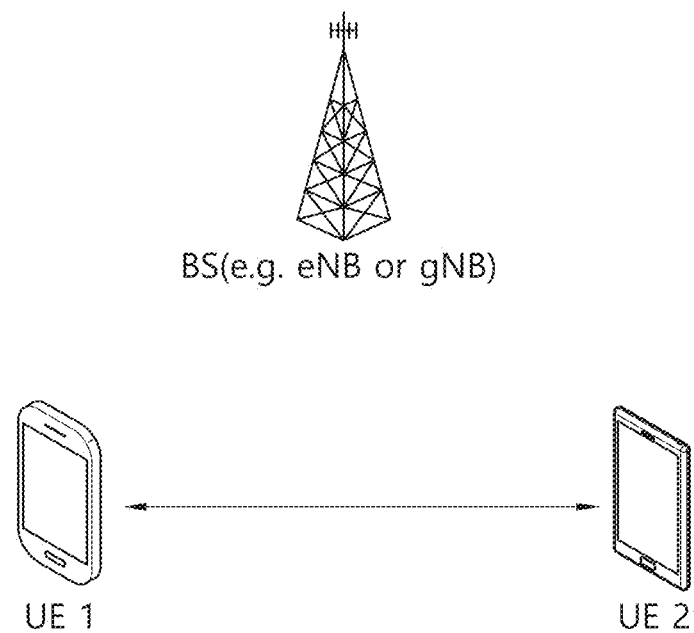
FIG. 9 shows a UE performing V2X or SL communication, in accordance with an embodiment of the present disclosure.

FIG. 9 shows a UE performing V2X or SL communication, in accordance with an embodiment of the present disclosure. The embodiment of FIG. 9 may be combined with various embodiments of the present disclosure.

Referring to FIG. 9, in V2X or SL communication, the term 'UE' may generally imply a UE of a user. However, if a network equipment such as a BS transmits/receives a signal according to a communication scheme between UEs, the BS may also be regarded as a sort of the UE. For example, a UE 1 may be a first apparatus 100, and a UE 2 may be a second apparatus 200.

For example, the UE 1 may select a resource unit corresponding to a specific resource in a resource pool which implies a set of series of resources. In addition, the UE 1 may transmit an SL signal by using the resource unit. For example, a resource pool in which the UE 1 is capable of transmitting a signal may be configured to the UE 2 which is a receiving UE, and the signal of the UE 1 may be detected in the resource pool.

Herein, if the UE 1 is within a connectivity range of the BS, the BS may inform the UE 1 of the resource pool. Otherwise, if the UE 1 is out of the connectivity range of the BS, another UE may inform the UE 1 of the resource pool, or the UE 1 may use a pre-configured resource pool.

In general, the resource pool may be configured in unit of a plurality of resources, and each UE may select a unit of one or a plurality of resources to use it in SL signal transmission thereof.

Hereinafter, resource allocation in SL will be described.

Figure 10:
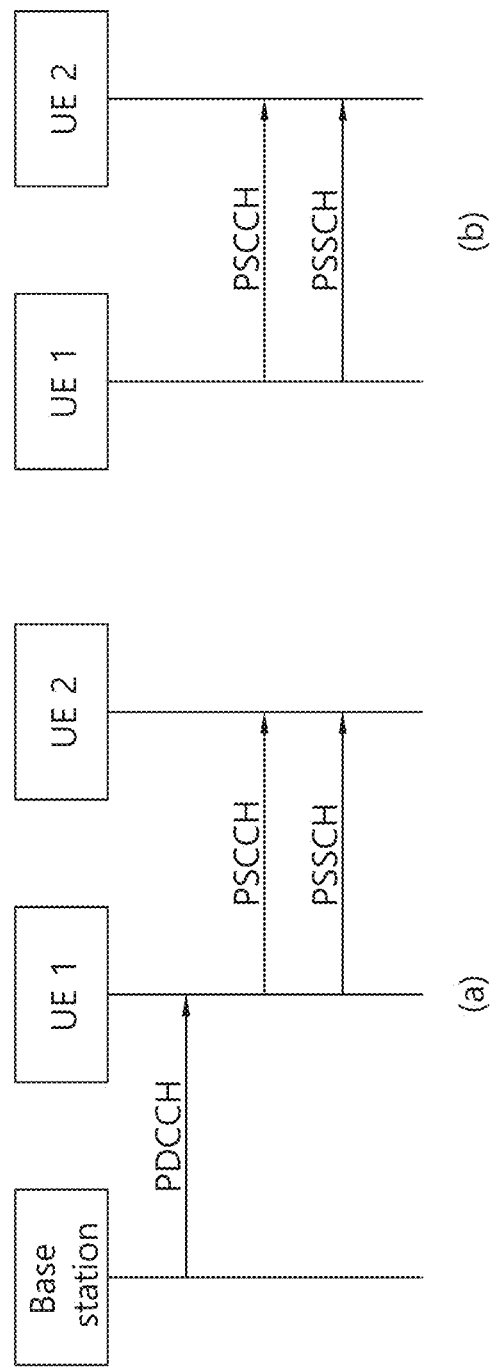
FIG. 10 shows a procedure of performing V2X or SL communication by a UE based on a transmission mode, in accordance with an embodiment of the present disclosure.

FIG. 10 shows a procedure of performing V2X or SL communication by a UE based on a transmission mode, in accordance with an embodiment of the present disclosure. The embodiment of FIG. 10 may be combined with various embodiments of the present disclosure. In various embodiments of the present disclosure, the transmission mode may be called a mode or a resource allocation mode. Hereinafter, for convenience of explanation, in LTE, the transmission mode may be called an LTE transmission mode. In NR, the transmission mode may be called an NR resource allocation mode.

For example, FIG. 10(a) shows a UE operation related to an LTE transmission mode 1 or an LTE transmission mode 3. Alternatively, for example, FIG. 10(a) shows a UE operation related to an NR resource allocation mode 1. For example, the LTE transmission mode 1 may be applied to general SL communication, and the LTE transmission mode 3 may be applied to V2X communication.

For example, FIG. 10(b) shows a UE operation related to an LTE transmission mode 2 or an LTE transmission mode 4. Alternatively, for example, FIG. 10(b) shows a UE operation related to an NR resource allocation mode 2.

Referring to FIG. 10(a), in the LTE transmission mode 1, the LTE transmission mode 3, or the NR resource allocation mode 1, a BS may schedule an SL resource to be used by the UE for SL transmission. For example, the BS may perform resource scheduling to a UE 1 through a PDCCH (more specifically, downlink control information (DCI)), and the UE lmay perform V2X or SL communication with respect to a UE 2 according to the resource scheduling. For example, the UE 1 may transmit a sidelink control information (SCI) to the UE 2 through a physical sidelink control channel (PSCCH), and thereafter transmit data based on the SCI to the UE 2 through a physical sidelink shared channel (PSSCH).

Referring to FIG. 10(b), in the LTE transmission mode 2, the LTE transmission mode 4, or the NR resource allocation mode 2, the UE may determine an SL transmission resource within an SL resource configured by a BS/network or a pre-configured SL resource. For example, the configured SL resource or the pre-configured SL resource may be a resource pool. For example, the UE may autonomously select or schedule a resource for SL transmission. For example, the UE may perform SL communication by autonomously selecting a resource within a configured resource pool. For example, the UE may autonomously select a resource within a selective window by performing a sensing and resource (re)selection procedure. For example, the sensing may be performed in unit of subchannels. In addition, the UE 1 which has autonomously selected the resource within the resource pool may transmit the SCI to the UE 2 through a PSCCH, and thereafter may transmit data based on the SCI to the UE 2 through a PSSCH.

Figure 11:
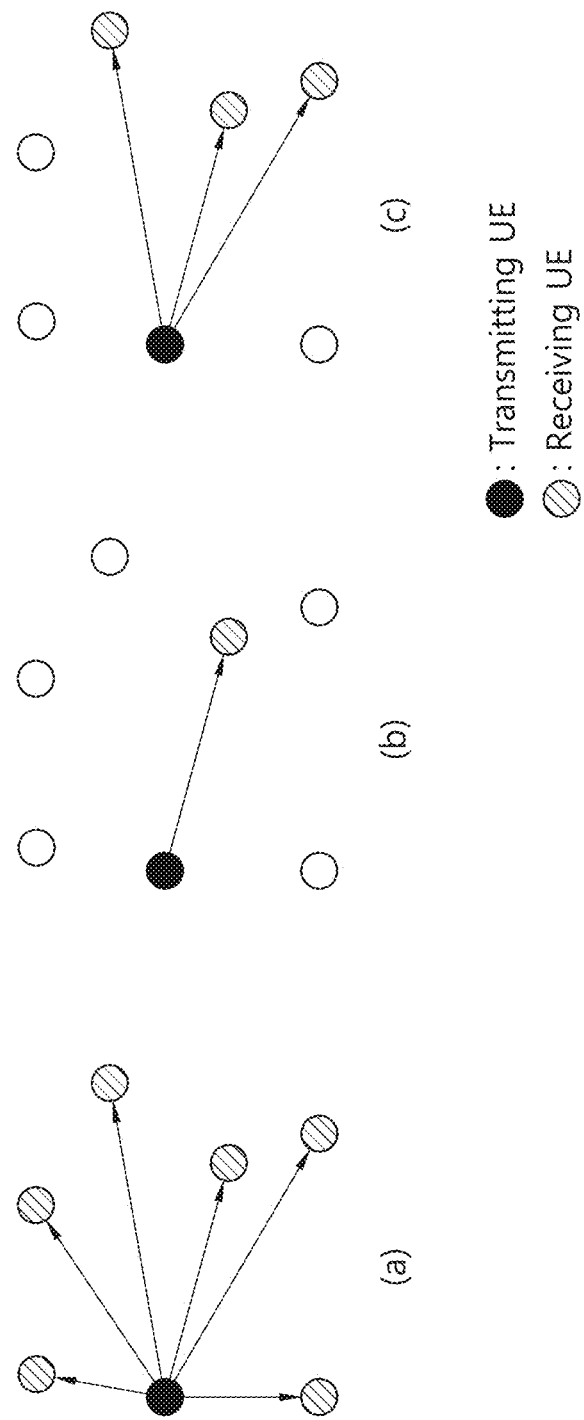
FIG. 11 shows three cast types, in accordance with an embodiment of the present disclosure.

FIG. 11 shows three cast types, in accordance with an embodiment of the present disclosure. The embodiment of FIG. 11 may be combined with various embodiments of the present disclosure. Specifically, FIG. 11(a) shows broadcast-type SL communication, FIG. 11(b) shows unicast type-SL communication, and FIG. 11(c) shows groupcast-type SL communication. In case of the unicast-type SL communication, a UE may perform one-to-one communication with respect to another UE. In case of the groupcast-type SL transmission, the UE may perform SL communication with respect to one or more UEs in a group to which the UE belongs. In various embodiments of the present disclosure, SL groupcast communication may be replaced with SL multicast communication, SL one-to-many communication, or the like.

Meanwhile, in various embodiments of the present disclosure, for example, "configuration" or "definition" may mean (pre-) configuration from a base station or a network. For example, "configuration" or "definition" may mean resource pool specific (pre-) configuration from a base station or a network via predefined signaling (e.g., SIB, MAC, RRC, etc.).

Meanwhile, in various embodiments of the present disclosure, for example, since the RLF may be determined based on the OUT-OF-SYNCH (OOS) indicator or the IN-SYNCH (IS) indicator, it may be replaced/substituted with OUT-OF-SYNCH (OOS) or IN-SYNCH (IS).

Meanwhile, in various embodiments of the present disclosure, resources may be interchanged/replaced with slots or symbols. For example, resources may include slots and/or symbols.

Meanwhile, in various embodiments of the present disclosure, the Uu channel may include a UL channel and/or a DL channel. For example, the UL channel may include a PUSCH, a PUCCH, and the like. For example, the DL channel may include a PDCCH, a PDSCH, and the like. For example, the SL channel may include PSCCH, PSSCH, PSFCH, PSBCH, and the like.

Meanwhile, in various embodiments of the present disclosure, the sidelink information may include at least one of a sidelink message, a sidelink packet, a sidelink service, sidelink data, sidelink control information, and/or a sidelink transport block (TB). For example, the sidelink information may be transmitted through a PSSCH and/or a PSCCH.

Meanwhile, when the UE performs sidelink communication based on a TDD operation, the base station may allocate some of the UL slots/symbols, flexible slots/symbols, or DL slots/symbols as sidelink slots/symbols. In this case, for example, in-coverage (INC) UEs may directly receive information related to configuration of a TDD slot corresponding to a UL slot/symbol, a flexible slot/symbol, a DL slot/symbol, or a sidelink slot/symbol among all resources from the base station. Out-of-coverage (OOC) UEs may determine a sidelink slot/symbol based on information related to pre-configured TDD slot configuration, and OOC UEs may perform sidelink communication. Therefore, when the base station reconfigures information related to the TDD slot configuration, which is different from the information related to the pre-configured TDD slot configuration, since information related to the TDD slot configuration is different between the INC UE and the OOC UE, sidelink communication between the INC UE and the OOC UE may be difficult.

The present disclosure proposes a method of transmitting information related to a TDD slot configuration through a PSBCH payload in S-SSB, which is used as a synchronization signal in sidelink communication. According to the proposed method, for example, an OOC UE may select an INC UE as a reference synchronization source. The OOC UE may receive information related to the changed TDD slot configuration through the PSBCH payload in the S-SSB transmitted by the INC UE. The OOC UE again transmits information related to the changed TDD slot configuration to nearby devices, as a result, same information related to the TDD slot configuration may be used between the OOC UE and the INC UE.

For example, the PSBCH payload may be configured with an MIB configured by a higher layer and a part configured by a physical layer. Hereinafter, in the present specification, the two parts may be collectively referred to as a PSBCH payload. For example, resources for sidelink communication may be divided into resources for transmitting the S-SSB and resources for transmitting other channels such as a PSCCH/PSSCH/PSFCH. In the case of resources for transmitting other channels such as a PSCCH/PSSCH/PSFCH, the base station may configure resources for transmitting other channels, such as a PSCCH/PSSCH/PSFCH through a configuration related to a sidelink resource pool. In addition, the UEs may transmit and receive configuration information related to the sidelink resource pool between the UEs. Hereinafter, various embodiments related to a method for the UE to transmit information related to a TDD slot configuration through a PSBCH will be described.

According to an embodiment of the present disclosure, the UE may exclude resources for transmitting a S-SSB from a sidelink resource pool, and may transmit the S-SSB independently. For example, resources in a frequency domain and a time domain for transmitting the S-SSB may be pre-configured by a higher layer signaling. For example, resources for transmitting other channels such as a PSCCH/PSSCH/PSFCH other than the S-SSB may be pre-configured as a sidelink resource pool by a higher layer signaling.

For example, the UE may transmit information related to a pre-configured sidelink resource pool by a higher layer signaling through a PSBCH. For example, the UE may transmit information related to a pre-configured sidelink resource pool in a form of a bit map. For example, the sidelink resource pool may be pre-configured by a higher layer signaling, and the UE may transmit information for slots/symbols to which the sidelink resource pool can be applied among information related to total TDD slots configuration through a PSBCH. For example, the UE may transmit information on slots/symbols to which a sidelink resource pool can be applied among information related to total TDD slots configuration in a form of a bitmap through a PSBCH. In this case, for example, the bit map may be configured to the subframe level, the slot level, or the symbol level.

In this way, when a S-SSB is excluded from a sidelink resource pool, for example, the UE may transmit the S-SSB through all symbols of a slot allocated for sidelink communication. In addition, the UE may transmit the remaining sidelink communication-related signals through all symbols or some symbols of the slots allocated to the sidelink communication. In this case, for example, all sidelink slots except for the resources for transmitting the S-SSB may be pre-configured to use the same number of symbols. In this case, for example, positions of symbols in one sidelink slot may be transmitted to the UE. For example, positions of symbols in one sidelink slot may be transmitted to the UE as a bit map of a symbol level.

Accordingly, the UE may transmit information related to total TDD slots configuration including all UL/flexible/DL/sidelink resources through a PSBCH. In addition, information related to a sidelink resource pool may be transmitted to the UE through a higher layer signaling. Alternatively, the UE may directly transmit information related to a sidelink resource pool through a PSBCH.

According to an embodiment of the present disclosure, a S-SSB may be pre-configured for the UE to include configuration information related to a sidelink resource pool. For example, the UE may use all symbols in a slot as resources for sidelink communication. For example, the UE may use some symbols in a slot as resources for sidelink communication. For example, when the UE always uses all symbols in one slot to transmit a S-SSB, exceptionally, the UE may use all symbols of the slot for transmitting the S-SSB regardless of configuration information related to a sidelink resource pool.

According to an embodiment of the present disclosure, when only some symbols are used for sidelink communication in a slot used for the sidelink communication, the UE may signal positions of sidelink symbols in one slot through the PSBCH using a bit map. For example, to reduce signaling overhead, by joint encoding the position of the start symbol (S) and the number of sidelink symbols (L), the positions of sidelink symbols may be transmitted. In this case, all sidelink symbols in one slot may be continuously located.

For example, the maximum number of symbols in one slot may be Lmax. For example, in the case of Equation 1 below, when a normal CP length is used, Lmax=14, and when an extended CP length is used, Lmax=12. As shown in Table 5 below, for example, when the UE uses a joint encoding (Start and Length Indication Value, (SLIV)), signaling overhead can be reduced.

TABLE 5 if $(L-1) \leq \frac{L_{max}}{2}$

SLIV = $L_{max}(L - 1) + S$
else
SLIV = $L_{max}(L_{max} - L + 1) + (L_{max} - 1 - S)$ In this case, for example, a bit value required for joint encoding may be determined as in Equation 1 below. For example, in the case of the above-described embodiment, a total of 7 bits may be required.

$$\left\lceil \log_2\left(\frac{L_{max}(L_{max} + 1)}{2}\right) \right\rceil \quad \text{[Equation 1]}$$

For example, symbols for sidelink communication may always start from a start symbol of a slot. For example, symbols for sidelink communication may always end in a last symbol of a slot. In this case, the UE may inform only information related to the number of symbols without notifying information on a position of a start symbol. In this case, for example, since a maximum value of the number of symbols in one slot is 14, by using a total of 4 bits, the UE may signal information related to a structure of the sidelink slot.

According to an embodiment of the present disclosure, the UE may transmit information on positions of sidelink slots for sidelink communication among all slots in a time domain for UL/flexible/DL/sidelink communication through a PSBCH. In addition, for each of the sidelink slots, information on a position of a sidelink symbol for sidelink communication among all symbols in the sidelink slot may be pre-configured for the UE. For example, the UE may transmit information on positions of sidelink slots for sidelink communication among all slots for UL/flexible/DL/sidelink communication through PSBCH, the UE may transmit information on positions of sidelink symbols among all symbols included in the sidelink slot for every sidelink slot. Hereinafter, for example, a pre-configured value may be a configuration value installed when manufacturing a product or a value transmitted from a server or a network device in advance. For example, a pre-configured information may be configuration information that OOC UEs can be installed and used in advance even without a connection with a base station (e.g., connection with a base station through a relay of a different UE).

According to an embodiment of the present disclosure, information on positions of sidelink slots for sidelink communication among all slots in a time domain for UL/flexible/DL/sidelink communication may be pre-configured for the UE. In addition, the UE may use pre-configured information on positions of sidelink slots. For example, the UE may transmit information on positions of sidelink symbols for sidelink communication among all symbols in the sidelink slot for every sidelink slot through a PSBCH. For example, information on positions of sidelink slots among all slots for UL/flexible/DL/sidelink communication may be pre-configured for the UE. For example, the UE may transmit information on positions of sidelink symbols among all symbols in the sidelink slot for every sidelink slot through a PSBCH.

In this case, for example, as information on the positions of sidelink slots or sidelink symbols, a bit map indicating a specific position within one period may be used.

For example, it can be assumed that sidelink slots or sidelink symbols are transmitted continuously at any location. In this case, the UE may inform a position of a start slot or a start symbol and the number of consecutive slots or consecutive symbols through joint encoding. For example, it may be assumed that consecutive slots or consecutive symbols always starting from a start slot or start symbol are transmitted within one period or slot. In this case, the UE may inform only the number of consecutive slots or consecutive symbols. For example, it may be assumed that consecutive slots or consecutive symbols always including a last slot or a last symbol are always transmitted within one period or slot. In this case, the UE may inform only the number of consecutive slots or consecutive symbols. For example, when the UE informs only the number of consecutive slots or consecutive slots, the UE may signal whether it includes the start slot or the start symbol or the last slot or the last symbol within one period or slot. For example, while transmitting information on the number of consecutive slots or consecutive slots, the UE may separately signal whether it includes a start slot or a start symbol or a last slot or a last symbol within one period or slot.

According to an embodiment of the present disclosure, configuration information may include information related to a TDD slot configuration classified as UL, DL, and flexible use by the base station for all slots (hereinafter, a first information), information related to configuration of a candidate slot that can be used for sidelink communication with respect to the TDD slot configuration of the first information (hereinafter, a second information), information related to configuration of a sidelink slot constituting an arbitrary resource pool with respect to the candidate sidelink slot configuration of the second information (hereinafter, a third information), information related to configuration of a sidelink symbol to be applied to each slot with respect to the candidate sidelink slot configuration of the second information (hereinafter, a fourth information), and information related to configuration of a sidelink symbol to be applied to each slot with respect to the sidelink slot configuration constituting the resource pool of the third information (hereinafter, a fifth information). For example, the candidate slot may replace one or more candidate slots.

For example, in the configuration information, information related to a resource pool configuration may be configured to a pre-configured value for the UE by a higher layer signaling, and a common configuration to all resource pools at the system-level may be pre-configured for the UE. In addition, the UE may transmit a common configuration to all resource pools through a PSBCH payload.

For example, information related to a resource pool configuration may be pre-configured for the UE, the UE may transmit the information related to the resource pool configuration through a PSBCH payload. And, a common configuration to all resource pools at the system-level may be configured for the UE as a pre-configured value by a higher layer signaling.

According to an embodiment of the present disclosure, the UE may transmit each of a pre-configured value and a PSBCH payload as resource pool information. For example, the third information and the fifth information may be configured to a pre-configured value as resource pool information. For example, the UE may configure the third information and the fifth information to a pre-configured value as resource pool information. And, the UE transmits the first information, the second information and the fourth information through the PSBCH payload. Or, by combining the first information and the second information, the UE may transmit a configuration for a candidate slot to which sidelink communication can be applied among all slots. For example, the candidate slot may replace one or more candidate slots.

For example, the UE may transmit the third information and the fifth information through the PSBCH payload. In addition, the first information, the second information, and the fourth information may be configured to a pre-configured value as resource pool information. For example, by combining the first information and the second information, a configuration for a candidate slot to which sidelink communication can be applied among all slots may be configured to a pre-configured value as resource pool information. For example, the UE may configure the first information, the second information, and the fourth information to a pre-configured value as resource pool information. For example, by combining the first information and the second information, the UE may configure a configuration for a candidate slot to which sidelink communication can be applied among all slots to a pre-configured value as resource pool information. For example, the candidate slot may replace one or more candidate slots.

According to an embodiment of the present disclosure, all of the second information, the third information, the fourth information, and the fifth information, which are configuration information related to sidelink communication, may be configured to a pre-configured value as resource pool information. For example, the UE may configure the second information, the third information, the fourth information, and the fifth information to a pre-configured value as resource pool information. And, the UE may transmit the first information through the PSBCH.

For example, the UE may transmit all of the second information, the third information, the fourth information, and the fifth information that are configuration information related to sidelink communication through the PSBCH. And, the UE may configure the first information to a pre-configured value as resource pool information. For example, the first information may be configured to a pre-configured value as resource pool information.

According to an embodiment of the present disclosure, for all sidelink slots used for sidelink communication, the same sidelink symbol configuration may be applied. For example, the UE may apply the same sidelink symbol configuration to all sidelink slots used for sidelink communication. For example, the all of the sidelink slots may be sidelink slots in which S-SSB related resources are excluded. And, by combining the fourth information and the fifth information, the UE may configure the sidelink symbol configuration.

For example, the UE may configure the third information to a pre-configured value as resource pool information. For example, the third information may be configured to a pre-configured value as resource pool information. And, the UE may transmit the first information and the second information through the PSBCH payload. For example, by combining the first information and the second information through the PSBCH payload, the UE may transmit a configuration for a candidate slot to which sidelink communication can be applied among all slots. And, the UE may transmit the fourth information and the fifth information through the PSBCH payload. For example, the UE may transmit a common sidelink symbol configuration applied to all sidelink slots by combining the fourth information and the fifth information through the PSBCH payload. For example, the all sidelink slots may be sidelink slots in which S-SSB related resources are excluded. For example, the candidate slot may replace one or more candidate slots.

For example, the UE may transmit the third information through the PSBCH payload. And, for example, the UE may configure the first information and the second information to a pre-configured value as resource pool information. For example, by combining the first information and the second information, the UE may configure a candidate slot to which sidelink communication can be applied among all slots to a pre-configured value as resource pool information. And, for example, the UE may configure the fourth information and the fifth information to a pre-configured value as resource pool information. For example, by combining the fourth information and the fifth information, the UE may configure a common sidelink symbol configuration applied to all sidelink slots to a pre-configured value as resource pool information. For example, the all sidelink slots may be sidelink slots in which S-SSB related resources are excluded. For example, the first information and the second information may be configured to a pre-configured value as resource pool information. For example, by combining the first information and the second information, a candidate slot to which sidelink communication can be applied among all slots may be configured to a pre-configured value as resource pool information. And, for example, the fourth information and the fifth information may be configured to a pre-configured value as resource pool information. For example, by combining the fourth information and the fifth information, a common sidelink symbol configuration applied to all sidelink slots may be configured to a pre-configured value as resource pool information. For example, the all sidelink slots may be sidelink slots in which S-SSB related resources are excluded. For example, the candidate slot may replace one or more candidate slots.

According to an embodiment of the present disclosure, information on sidelink slot configuration and information on sidelink symbol configuration may be transmitted, respectively. For example, the UE may configure the first information, the second information, and the third information to a pre-configured value as resource pool information. For example, by combining the first information and the second information, the UE may configure a candidate slot to which sidelink communication can be applied among all slots as a pre-configured value as resource pool information. For example, the first information, the second information, and the third information may be configured to a pre-configured value as resource pool information. For example, by combining the first information and the second information, a candidate slot to which sidelink communication can be applied among all slots may be configured as a pre-configured value as resource pool information. And, for example, the UE may transmit the fourth information and the fifth information through the PSBCH payload. For example, the UE may transmit a common sidelink symbol configuration applied to all sidelink slots by combining the fourth information and the fifth information through the PSBCH payload. For example, the all sidelink slots may be sidelink slots in which S-SSB related resources are excluded. For example, the candidate slot may replace one or more candidate slots.

For example, the UE may transmit the first information, the second information, and the third information through the PSBCH payload. For example, by combining the first information and the second information through the PSBCH payload, the UE may transmit a configuration for a candidate slot to which sidelink communication can be applied among all slots. And, for example, the UE may configure the fourth information and the fifth information to a pre-configured value as resource pool information. For example, by combining the fourth information and the fifth information, the UE may configure a common sidelink symbol configuration applied to all sidelink slots to a pre-configured value as resource pool information. For example, the all sidelink slots may be sidelink slots in which S-SSB related resources are excluded. For example, the fourth information and the fifth information may be configured to a pre-configured value as resource pool information. For example, by combining the fourth information and the fifth information, a common sidelink symbol configuration applied to all sidelink slots may be configured to a pre-configured value as resource pool information. For example, the candidate slot may replace one or more candidate slots.

According to an embodiment of the present disclosure, configuration by a pre-configured value as resource pool information and transmission using a PSBCH payload may be performed. For example, the UE may configure the first information and the second information to a pre-configured value as resource pool information. For example, by combining the first information and the second information, the UE may configure a candidate slot to which sidelink communication can be applied among all slots as a pre-configured value as resource pool information. For example, the first information and the second information may be configured to a pre-configured value as resource pool information. For example, by combining the first information and the second information, a candidate slot to which sidelink communication can be applied among all slots may be configured as a pre-configured value as resource pool information. In addition, For example, the UE may transmit the third information, the fourth information, and the fifth information through the PSBCH payload. For example, the UE may transmit a common sidelink symbol configuration applied to all sidelink slots by combining the fourth information and the fifth information through the PSBCH payload. For example, the all sidelink slots may be sidelink slots in which S-SSB related resources are excluded. For example, the candidate slot may replace one or more candidate slots.

For example, the UE may transmit the first information and the second information through the PSBCH payload. For example, by combining the first information and the second information through the PSBCH payload, the UE may transmit a configuration for a candidate slot to which sidelink communication can be applied among all slots. And, for example, the UE may configure the third information, the fourth information, and the fifth information to a pre-configured value as resource pool information. For example, by combining the fourth information and the fifth information, the UE may configure a common sidelink symbol configuration applied to all sidelink slots to a pre-configured value as resource pool information. For example, the all sidelink slots may be sidelink slots in which S-SSB related resources are excluded. For example, the third information, the fourth information, and the fifth information may be configured to a pre-configured value as resource pool information. For example, by combining the fourth information and the fifth information, a common sidelink symbol configuration applied to all sidelink slots may be configured to a pre-configured value as resource pool information. For example, the candidate slot may replace one or more candidate slots.

According to an embodiment of the present disclosure, for each combination of the first to fifth information described above, the UE may transmit the resource configuration information transmitted as the PSBCH payload as it is, the resource pool information may include both resource configuration information transmitted through the PSBCH payload and a pre-configured resource configuration information as resource pool information.

For example, the UE may transmit configuration information for candidate sidelink resources that can be used for sidelink communication among all resources through the PSBCH payload. For example, the PSBCH payload may be pre-configured or configured for the UE by a higher layer signaling. In this case, for example, the configuration information for the candidate sidelink resources may be information commonly applied to a cell or a system. For example, the configuration information for the candidate sidelink resources may be information in unit of slots. Alternatively, for example, the configuration information for the candidate sidelink resources may be information including a slot unit and a symbol unit.

For example, resource pool information pre-configured by a higher layer signaling may include candidate sidelink resource configuration information (e.g., candidate sidelink resource configuration information transmitted through the PSBCH payload), slot-level bitmap information constituting the actual sidelink resource pool and symbol configuration for slots constituting the actual sidelink resource pool (e.g., the number and positions of symbols in the sidelink slot, distribution of contiguous or non-contiguous sidelink symbols).

For example, based on the candidate sidelink resource information transmitted through the PSBCH payload, the UE may actually transmit sidelink resource pool information used for sidelink communication. For example, a resource constituting an actual sidelink resource pool may be designated in a form of a bit map for the candidate sidelink resources. In this case, for example, when the candidate sidelink resources are information configured in unit of slots, the information constituting the sidelink resource pool may include a bitmap in unit of slots.

For example, all sidelink slots constituting the sidelink resource pool may have the same symbol configuration. That is, for example, the number and position of sidelink symbols to be used for sidelink communication in one sidelink slot may be fixed, and the same symbol configuration may be applied to all sidelink slots.

In this case, for example, sidelink symbols in a sidelink slot may be composed of continuous symbols or non-consecutive symbols. For example, in a case in which consecutive symbols are configured, configuration information related to consecutive symbols may be efficiently signaled according to various embodiments of the present disclosure. For example, when configured with non-consecutive symbols, the configuration information may be signaled in the form of a bit map.

In various embodiments of the present disclosure, the number of sidelink symbols applied to a sidelink slot may be different based on whether or not PSFCH is transmitted. More specifically, for example, regardless of whether the PSFCH is transmitted or not, the number of sidelink symbols constituting the PSCCH and the PSSCH may be the same for all sidelink slots. For example, all sidelink slots may not include resources related to S-SSB. Therefore, reception coverage of the PSCCH and the PSSCH may not be different according to the sidelink slot. In this case, for example, when PSFCH is transmitted, sidelink symbols required for PSFCH transmission may be additionally allocated to the sidelink slot. In this case, for example, the number of sidelink symbols required for PSFCH transmission may be the same for all sidelink slots except for S-SSB. For example, the number of sidelink symbols required for PSFCH transmission may be different for each sidelink slot based on a amount of data to be transmitted by the PSFCH. In this case, for example, the number of sidelink symbols to be used for the PSFCH may be pre-configured by a higher layer signaling.

In the present disclosure, the INC UE and the OOC UE may share same information related to the TDD slot configuration. In order to perform sidelink communication based on a resource composed of a sidelink slot/symbol configured for sidelink communication, the UE can efficiently transmit information related to a TDD slot configuration through the PSBCH.

In addition, when the UE does not use the same number of symbols for sidelink communication in all sidelink slots except for resources for transmitting S-SSB, since the base station or the UE needs to transmit information related to symbols used in every slot, a problem of signaling overhead may occur.

For example, a set of slots included in a sidelink resource pool may be all slots except for a slot in which an S-SSB is configured and a non-sidelink slot. For example, the non-sidelink slot may be a slot in which at least one of the Nth symbol to the N+M-lth OFDM symbol is not semi-statically configured as a UL symbol according to a parameter of a higher layer. Herein, for example, the UE may receive at least one of information related to the N value or information related to the M value from the base station. For example, the N may be a position of a sidelink start symbol, and the M may be a length or number of sidelink symbols.

Figure 12:
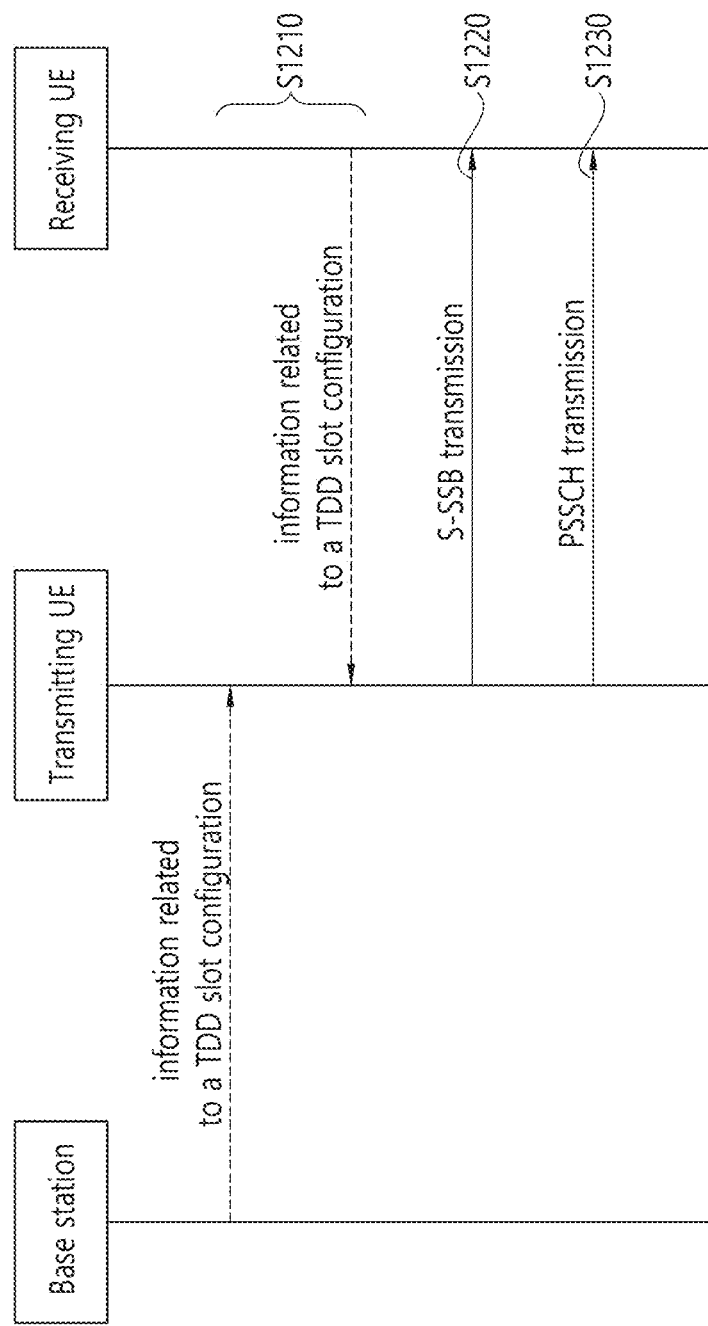
FIG. 12 shows a procedure for a transmitting UE to transmit a PSSCH to a receiving UE based on information related to a TDD slot configuration, according to an embodiment of the present disclosure.

FIG. 12 shows a procedure for a transmitting UE to transmit a PSSCH to a receiving UE based on information related to a TDD slot configuration, according to an embodiment of the present disclosure. FIG. 12 may be combined with various embodiments of the present disclosure.

Referring to FIG. 12, in step S1210, the transmitting UE may receive information related to a TDD slot configuration. For example, the transmitting UE may receive information related to a TDD slot configuration from the base station. For example, the transmitting UE may receive information related to a TDD slot configuration from the receiving UE.

In step S1220, the transmitting UE may transmit a S-SSB to the receiving UE. For example, the S-SSB may include a sidelink primary synchronization signal (S-PSS), a sidelink secondary synchronization signal (S-SSS), and a physical sidelink broadcast channel (PSBCH). For example, resources for transmitting the S-SSB may be pre-configured for the transmitting UE by a higher layer. For example, resources for transmitting the S-SSB may include resources in a frequency domain and a time domain.

For example, the transmitting UE may transmit information related to a sidelink resource pool pre-configured by a higher layer to the receiving UE through the PSBCH. For example, the pre-configured information related to the sidelink resource pool may be in a form of a bit map. For example, the transmitting UE may transmit information related to the TDD slot configuration to the receiving UE through the PSBCH. For example, the transmitting UE may transmit information on sidelink slots or sidelink symbols included in a sidelink resource pool among the information related to the TDD slot configuration to the receiving UE through the PSBCH. For example, the information on sidelink slots or sidelink symbols included in the sidelink resource pool among the information related to the TDD slot configuration may be in a form of a bit map. For example, the bitmap may be configured based on any one of a subframe, a slot, or a symbol. For example, the bitmap may be configured based on any one of a subframe unit, a slot unit, or a symbol unit.

In step S1230, the transmitting UE may transmit a PSSCH to the receiving UE based on the information related to the TDD slot configuration. For example, candidate resources to which a bitmap related to a sidelink resource pool is applied may be configured based on the information related to the TDD slot configuration. For example, the candidate resources may include one or more slots. For example, configuration information related to a sidelink symbol included in each of the one or more slots may be received. For example, the configuration information related to the sidelink symbol may include information related to a position of the sidelink symbol. For example, the position of the sidelink symbol may be identically configured for the candidate resources. For example, the information related to the TDD slot configuration may include at least one of a UL slot/symbol, a DL slot/symbol, or an SL slot/symbol. For example, the UL slot/symbol included in the information related to the TDD slot configuration may be configured as candidate resources to which a bitmap related to a sidelink resource pool is applied.

For example, the transmitting UE may receive information related to a position of a sidelink symbol included in each of one or more slots. For example, the transmitting UE may receive information related to a position of a sidelink symbol included in each of one or more slots from the base station. For example, the information related to the position of the sidelink symbol included in the each of one or more slots may be pre-configured for a transmitting UE. For example, the information related to the position of the sidelink symbol included in the each of one or more slots may be in a form of a bit map. For example, the bitmap may be configured based on a symbol. For example, the bitmap may be configured based on a symbol unit.

Figure 13:
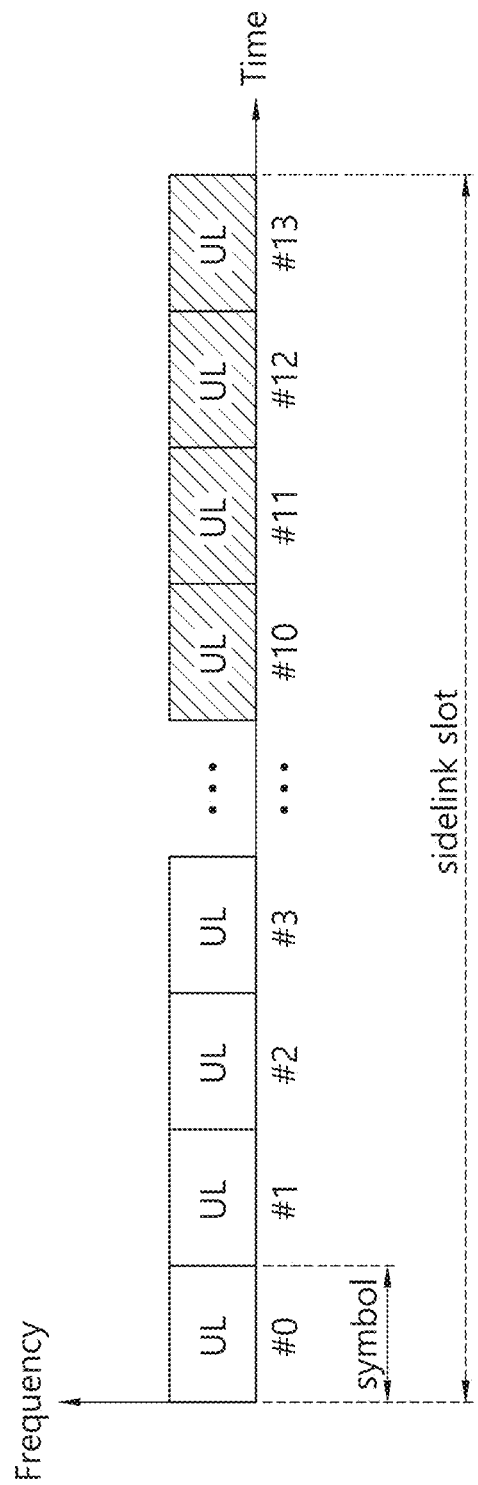
FIG. 13 shows an example in which a sidelink symbol is allocated in a sidelink slot according to an embodiment of the present disclosure.
Figure 14:
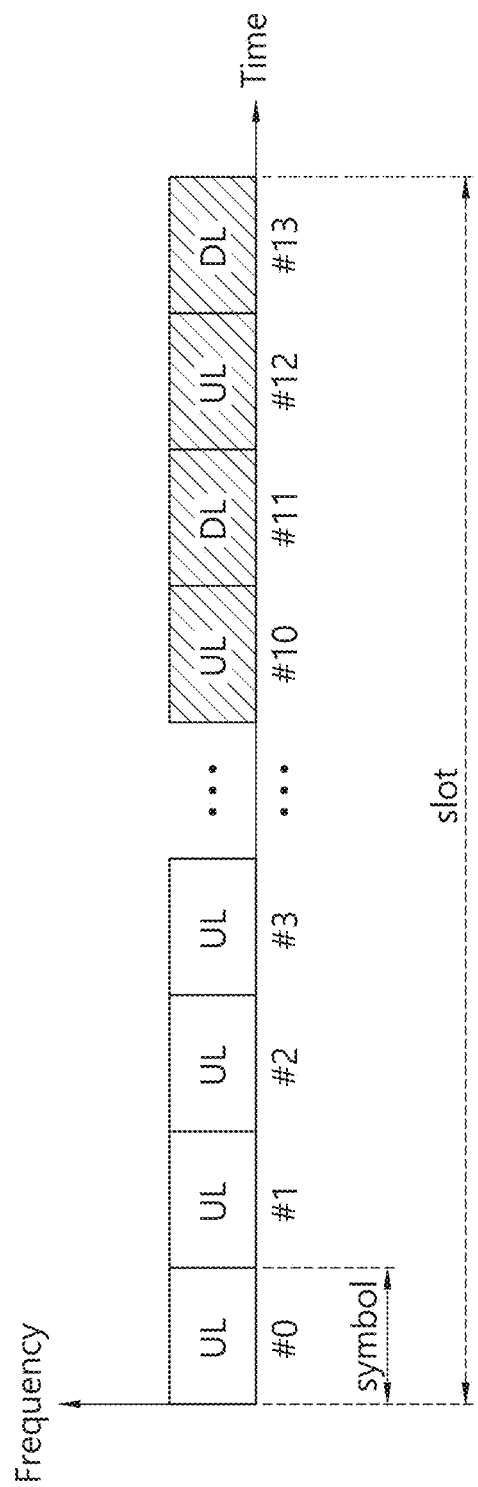
FIG. 14 shows an example of a slot excluded from a sidelink slot according to an embodiment of the present disclosure.

FIG. 13 shows an example in which a sidelink symbol is allocated in a sidelink slot according to an embodiment of the present disclosure. FIG. 14 shows an example of a slot excluded from a sidelink slot according to an embodiment of the present disclosure. FIG. 13 and FIG. 14 may be combined with various embodiments of the present disclosure.

For example, the transmitting UE may receive information related to a TDD slot configuration to the base station. The transmitting UE may transmit a PSSCH to the receiving UE using a sidelink slot based on information related to a TDD slot configuration. In this case, for example, at least one UL slot among a plurality of slots included in the information related to the TDD slot configuration may be allocated as a sidelink slot. For example, the UL slot may be determined based on parameters signaled by the UE from a higher layer. For example, the parameters may include a start symbol of sidelink symbols or a length or number of sidelink symbols.

Referring to FIG. 13, one slot may include a plurality of symbols. For example, one slot may include 14 symbols. The use of each symbol for one slot may be determined based on the TDD slot configuration. For example, when the transmitting UE may determine a start symbol for the sidelink symbols as symbol #10 based on parameters signaled from a higher layer and the number of sidelink symbols is determined to be 4, if the symbols of symbol #10 to symbol #13 are UL symbols, the transmitting UE may use symbols #10 to #13 as sidelink symbols. That is, the transmitting UE may use the slot of FIG. 13 as a sidelink slot, and the transmitting UE may transmit a PSSCH to the receiving UE on the sidelink slot. For example, the number of sidelink symbols in one slot signaled from a higher layer may be less than or equal to the number of pre-configured UL symbols in the one slot. For example, based on positions of the sidelink symbols and the number of sidelink symbols signaled from a higher layer, the transmitting UE may determine a duration of the sidelink symbol. When a symbol in the duration of the sidelink symbol consists of a UL symbol, the transmitting UE may transmit a PSSCH to the receiving UE in the duration of the sidelink symbol.

Referring to FIG. 14, when the transmitting UE may determine a start symbol for the sidelink symbols as symbol #10 based on parameters signaled from a higher layer and the number of sidelink symbols is determined to be 4, if there is a symbol for a different purpose other than a UL symbol among the symbols of symbols #10 to #13, the transmitting UE cannot use a slot including the symbol as a sidelink slot. That is, the slot of FIG. 14 cannot be used by the UE as a sidelink slot. For example, based on positions of the sidelink symbols and the number of sidelink symbols signaled from a higher layer, the transmitting UE may determine a duration of the sidelink symbols in one slot. In this case, when a symbol in the sidelink symbol duration in one slot is composed of a symbol for a different purpose other than the UL symbol (e.g., DL symbol (symbol #11, symbol #13), the one slot cannot be used as a sidelink slot.

Figure 15:
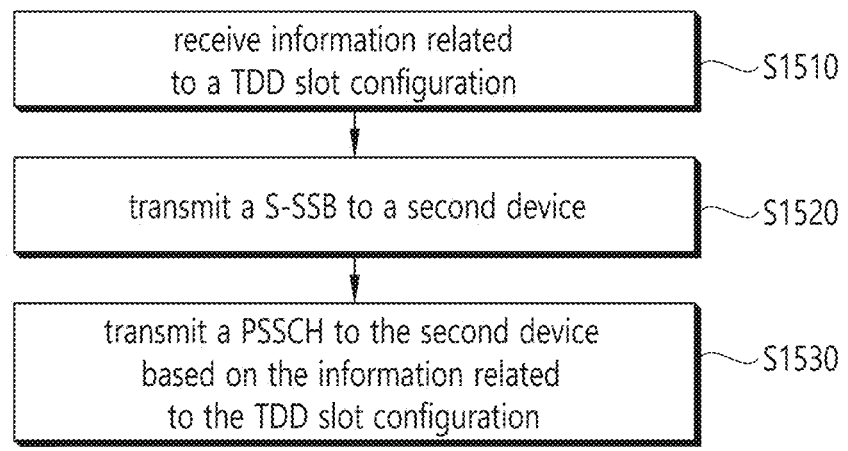
FIG. 15 shows a method for a first device to transmit a PSSCH to a second device based on information related to a TDD slot configuration according to an embodiment of the present disclosure.

FIG. 15 shows a method for a first device to transmit a PSSCH to a second device based on information related to a TDD slot configuration according to an embodiment of the present disclosure. FIG. 15 may be combined with various embodiments of the present disclosure.

Referring to FIG. 15, in step S1510, the first device 100 may receive information related to a time division duplex (TDD) slot configuration. For example, the first device 100 may receive information related to a TDD slot configuration from the base station. For example, the first device 100 may receive information related to a TDD slot configuration from the second device 200.

In step S1520, the first device 100 may transmit a sidelink-synchronization signal block (S-SSB) to the second device 200. For example, the S-SSB may include a sidelink primary synchronization signal (S-PSS), a sidelink secondary synchronization signal (S-SSS), and a physical sidelink broadcast channel (PSBCH). For example, resources for transmitting the S-SSB may be pre-configured by a higher layer. For example, resources for transmitting the S-SSB may include resources in a frequency domain and a time domain.

For example, the first device 100 may transmit information related to a pre-configured sidelink resource pool by a higher layer to the second device 200 through the PSBCH. For example, the information related to the pre-configured sidelink resource pool may be in a form of a bit map. For example, the first device 100 may transmit the information related to the TDD slot configuration to the second device 200 through the PSBCH. For example, the first device 100 may transmit information on a sidelink slot or a sidelink symbol included in a sidelink resource pool among the information related to the TDD slot configuration to the second device 200 through the PSBCH. For example, the information on the sidelink slot or the sidelink symbol included in the sidelink resource pool among the information related to the TDD slot configuration may be in a form of a bit map. For example, the bitmap may be configured based on any one of a subframe unit, a slot unit, or a symbol unit.

In step S1530, the first device 100 may transmit a PSSCH to the second device 200 based on based on the information related to the TDD slot configuration. For example, candidate resources to which a bitmap related to a sidelink resource pool is applied may be configured based on the information related to the TDD slot configuration. For example, the candidate resources may include one or more slots. For example, configuration information related to a sidelink symbol included in each of the one or more slots may be received. For example, the configuration information related to the sidelink symbol may include information related to a position of the sidelink symbol. For example, the position of the sidelink symbol may be configured to be the same for the candidate resources. For example, the information related to the TDD slot configuration may include at least one of a UL slot/symbol, a DL slot/symbol, or a SL slot/symbol. For example, the UL slot/symbol included in the information related to the TDD slot configuration may be configured as candidate resources to which a bitmap related to a sidelink resource pool is applied.

For example, the first device 100 may receive the information related to the position of the sidelink symbol included in each of the one or more slots. For example, the first device 100 may receive the information related to the position of the sidelink symbol included in each of the one or more slots from the base station. For example, the information related to the position of the sidelink symbol included in each of the one or more slots may be pre-configured. For example, the information related to the position of the sidelink symbol included in each of the one or more slots may be in a form of a bit map. For example, the bitmap may be configured based on a symbol unit.

For example, the configuration information related to the sidelink symbol may further include information related to the number of sidelink symbols. For example, the number of sidelink symbols may be configured for the candidate resources to be the same.

For example, the sidelink resource pool may be configured based on the candidate resources. For example, resources for transmitting the S-SSB may not be included in the sidelink resource pool.

The above-described embodiment may be applied to various devices to be described below. First, for example, the processor 102 of the first device 100 may control the transceiver 106 to transmit to receive information related to a time division duplex (TDD) slot configuration. And, for example, the processor 102 of the first device 100 may control the transceiver 106 to transmit a sidelink-synchronization signal block (S-SSB) to the second device 200. And, for example, the processor 102 of the first device 100 may control the transceiver 106 to transmit a PSSCH to the second device 200 based on based on the information related to the TDD slot configuration.

According to an embodiment of the present disclosure, a first device configured to perform wireless communication may be provided. For example, the first device may comprise: one or more memories storing instructions; one or more transceivers; and one or more processors connected to the one or more memories and the one or more transceivers. For example, the one or more processors may execute the instructions to: receive information related to a time division duplex (TDD) slot configuration, transmit, to a second device, a sidelink-synchronization signal block (S-SSB), wherein the S-SSB includes a sidelink primary synchronization signal (S-PSS), a sidelink secondary synchronization signal (S-SSS) and a physical sidelink broadcast channel (PSBCH), transmit, to the second device, a physical sidelink shared channel (PSSCH) based on the information related to the TDD slot configuration. For example, candidate resources to which a bitmap related to a sidelink resource pool is applied are configured based on the information related to the TDD slot configuration. For example, the candidate resources include one or more slots. For example, configuration information related to a sidelink symbol included in each of the one or more slots is received. For example, the configuration information related to the sidelink symbol includes information related to a position of the sidelink symbol. For example, the position of the sidelink symbol is configured to be the same for the candidate resources.

According to an embodiment of the present disclosure, an apparatus configured to control a first user equipment (UE) may be provided. For example, the apparatus may comprise: one or more processors; and one or more memories operably connected to the one or more processors and storing instructions. For example, the one or more processors may execute the instructions to: receive information related to a time division duplex (TDD) slot configuration, transmit, to a second UE, a sidelink-synchronization signal block (S-SSB), wherein the S-SSB includes a sidelink primary synchronization signal (S-PSS), a sidelink secondary synchronization signal (S-SSS) and a physical sidelink broadcast channel (PSBCH), transmit, to the second UE, a physical sidelink shared channel (PSSCH) based on the information related to the TDD slot configuration. For example, candidate resources to which a bitmap related to a sidelink resource pool is applied are configured based on the information related to the TDD slot configuration. For example, the candidate resources include one or more slots. For example, configuration information related to a sidelink symbol included in each of the one or more slots is received. For example, the configuration information related to the sidelink symbol includes information related to a position of the sidelink symbol. For example, the position of the sidelink symbol is configured to be the same for the candidate resources.

According to an embodiment of the present disclosure, a non-transitory computer-readable storage medium storing instructions may be provided. For example, the instructions, when executed, cause a first device to: receive information related to a time division duplex (TDD) slot configuration, transmit, to a second device, a sidelink-synchronization signal block (S-SSB), wherein the S-SSB includes a sidelink primary synchronization signal (S-PSS), a sidelink secondary synchronization signal (S-SSS) and a physical sidelink broadcast channel (PSBCH), transmit, to the second device, a physical sidelink shared channel (PSSCH) based on the information related to the TDD slot configuration. For example, candidate resources to which a bitmap related to a sidelink resource pool is applied are configured based on the information related to the TDD slot configuration. For example, the candidate resources include one or more slots. For example, configuration information related to a sidelink symbol included in each of the one or more slots is received. For example, the configuration information related to the sidelink symbol includes information related to a position of the sidelink symbol. For example, the position of the sidelink symbol is configured to be the same for the candidate resources.

Figure 16:
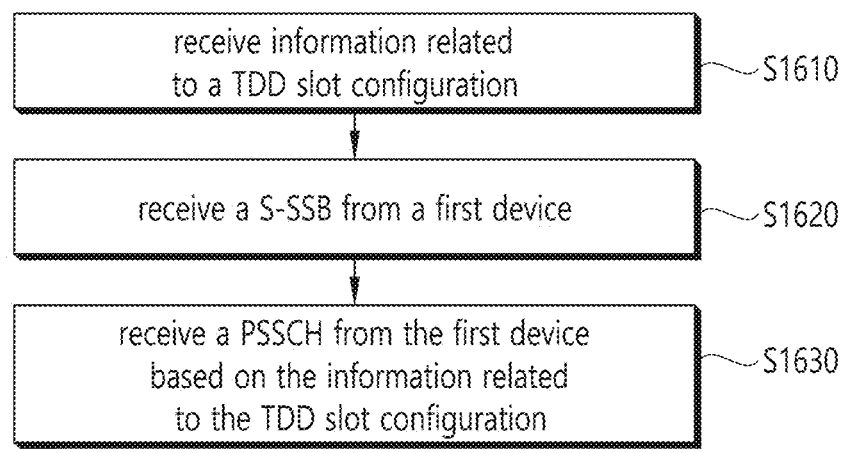
FIG. 16 shows a method for a second device to receive a PSSCH from a first device based on information related to a TDD slot configuration according to an embodiment of the present disclosure.

FIG. 16 shows a method for a second device to receive a PSSCH from a first device based on information related to a TDD slot configuration according to an embodiment of the present disclosure. FIG. 16 may be combined with various embodiments of the present disclosure.

Referring to FIG. 16, in step S1610, the second device 200 may receive information related to a TDD slot configuration. For example, the second device 200 may receive information related to a TDD slot configuration from the base station. For example, the second device 200 may receive information related to a TDD slot configuration from the first device 100.

In step S1620, the second device 200 may receive a S-SSB from the first device 100. For example, the S-SSB may include a sidelink primary synchronization signal (S-PSS), a sidelink secondary synchronization signal (S-SSS), and a physical sidelink broadcast channel (PSBCH). For example, resources for transmitting the S-SSB may be pre-configured by a higher layer. For example, resources for transmitting the S-SSB may include resources in a frequency domain and a time domain.

For example, the second device 200 may receive information related to a pre-configured sidelink resource pool by a higher layer from the first device 100 through the PSBCH. For example, the information related to the pre-configured sidelink resource pool may be in a form of a bit map. For example, the second device 200 may receive the information related to the TDD slot configuration from the first device 100 through the PSBCH. For example, the second device 200 may receive information on a sidelink slot or a sidelink symbol included in a sidelink resource pool among the information related to the TDD slot configuration from the first device 100 through the PSBCH. For example, the information on the sidelink slot or the sidelink symbol included in the sidelink resource pool among the information related to the TDD slot configuration may be in a form of a bit map. For example, the bitmap may be configured based on any one of a subframe unit, a slot unit, or a symbol unit.

In step S1630, the second device 200 may receive a PSSCH from the first device 100 based on based on the information related to the TDD slot configuration. For example, candidate resources to which a bitmap related to a sidelink resource pool is applied may be configured based on the information related to the TDD slot configuration. For example, the candidate resources may include one or more slots. For example, configuration information related to a sidelink symbol included in each of the one or more slots may be received. For example, the configuration information related to the sidelink symbol may include information related to a position of the sidelink symbol. For example, the position of the sidelink symbol may be configured to be the same for the candidate resources. For example, the information related to the TDD slot configuration may include at least one of a UL slot/symbol, a DL slot/symbol, or a SL slot/symbol. For example, the UL slot/symbol included in the information related to the TDD slot configuration may be configured as candidate resources to which a bitmap related to a sidelink resource pool is applied.

For example, the configuration information related to the sidelink symbol may further include information related to the number of sidelink symbols. For example, the number of sidelink symbols may be configured for the candidate resources to be the same.

For example, the sidelink resource pool may be configured based on the candidate resources. For example, resources for transmitting the S-SSB may not be included in the sidelink resource pool.

The above-described embodiment may be applied to various devices to be described below. First, for example, the processor 202 of the second device 200 may control the transceiver 206 to receive information related to a TDD slot configuration. And, for example, the processor 202 of the second device 200 may control the transceiver 206 to receive a S-SSB from the first device 100. And, for example, the processor 202 of the second device 200 may control the transceiver 206 to receive a PSSCH from the first device 100 based on based on the information related to the TDD slot configuration According to an embodiment of the present disclosure, a second device configured to perform wireless communication may be provided. For example, the second device may comprise: one or more memories storing instructions; one or more transceivers; and one or more processors connected to the one or more memories and the one or more transceivers. For example, the one or more processors may execute the instructions to: receive information related to a time division duplex (TDD) slot configuration, receive, from a first device, a sidelink-synchronization signal block (S-SSB), wherein the S-SSB includes a sidelink primary synchronization signal (S-PSS), a sidelink secondary synchronization signal (S-SSS) and a physical sidelink broadcast channel (PSBCH), receive, from the first device, a physical sidelink shared channel (PSSCH) based on the information related to the TDD slot configuration. For example, candidate resources to which a bitmap related to a sidelink resource pool is applied are configured based on the information related to the TDD slot configuration. For example, the candidate resources include one or more slots. For example, configuration information related to a sidelink symbol included in each of the one or more slots is received. For example, the configuration information related to the sidelink symbol includes information related to a position of the sidelink symbol. For example, the position of the sidelink symbol is configured to be the same for the candidate resources.

Hereinafter, an apparatus to which various embodiments of the present disclosure can be applied will be described.

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 17:
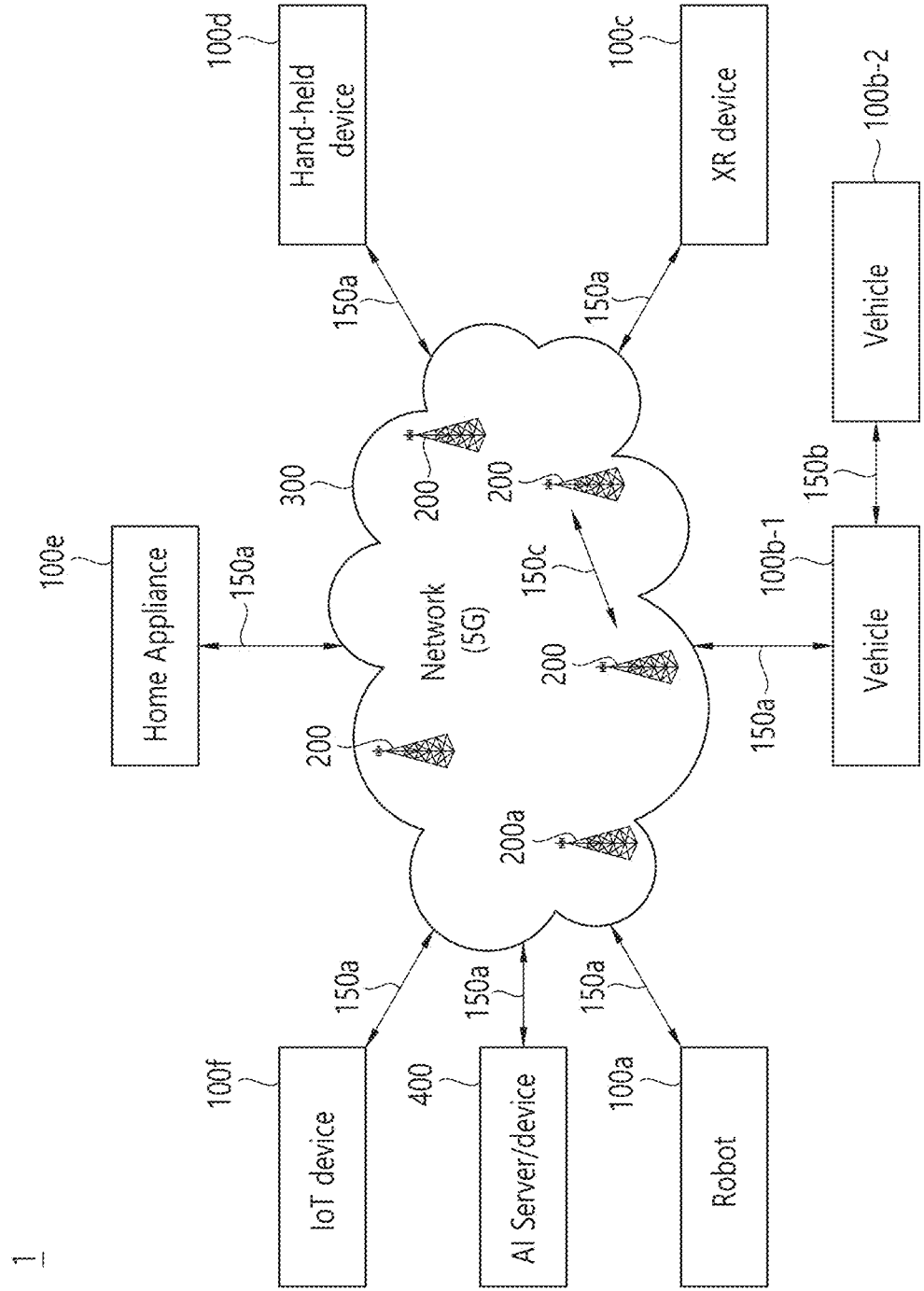
FIG. 17 shows a communication system 1, in accordance with an embodiment of the present disclosure.

FIG. 17 shows a communication system 1, in accordance with an embodiment of the present disclosure.

Referring to FIG. 17, a communication system 1 to which various embodiments of the present disclosure are applied includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smart-pad, a wearable device (e.g., a smartwatch or a smart-glasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

Herein, the wireless communication technology implemented in the wireless device of the present specification may include a narrowband Internet of Things for low-power communication as well as LTE, NR, and 6G. In this case, for example, the NB-IoT technology may be an example of a Low Power Wide Area Network (LPWAN) technology, and may be implemented in standards such as LTE Cat NB1 and/or LTE Cat NB2, and is not limited to the above-described name. Additionally or alternatively, the wireless communication technology implemented in the wireless device of the present specification may perform communication based on LTE-M technology. In this case, as an example, the LTE-M technology may be an example of an LPWAN technology, and may be called by various names such as enhanced machine type communication (eMTC). LTE-M technology may be implemented in at least one of 1) LTE CAT 0, 2) LTE Cat M1, 3) LTE Cat M2, 4) LTE non-Bandwidth Limited (non-BL), 5) LTE-MTC, 6) LTE Machine Type Communication, and/or 7) LTE M, and is not limited to the above-mentioned name. Additionally or alternatively, the wireless communication technology implemented in the wireless device of this specification may include at least one of ZigBee, Bluetooth, and Low Power Wide Area Network (LPWAN) and is not limited to the above-mentioned name. For example, the ZigBee technology may create personal area networks (PAN) related to small/low-power digital communication based on various standards such as IEEE 802.15.4, and can be called by various names.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 18:
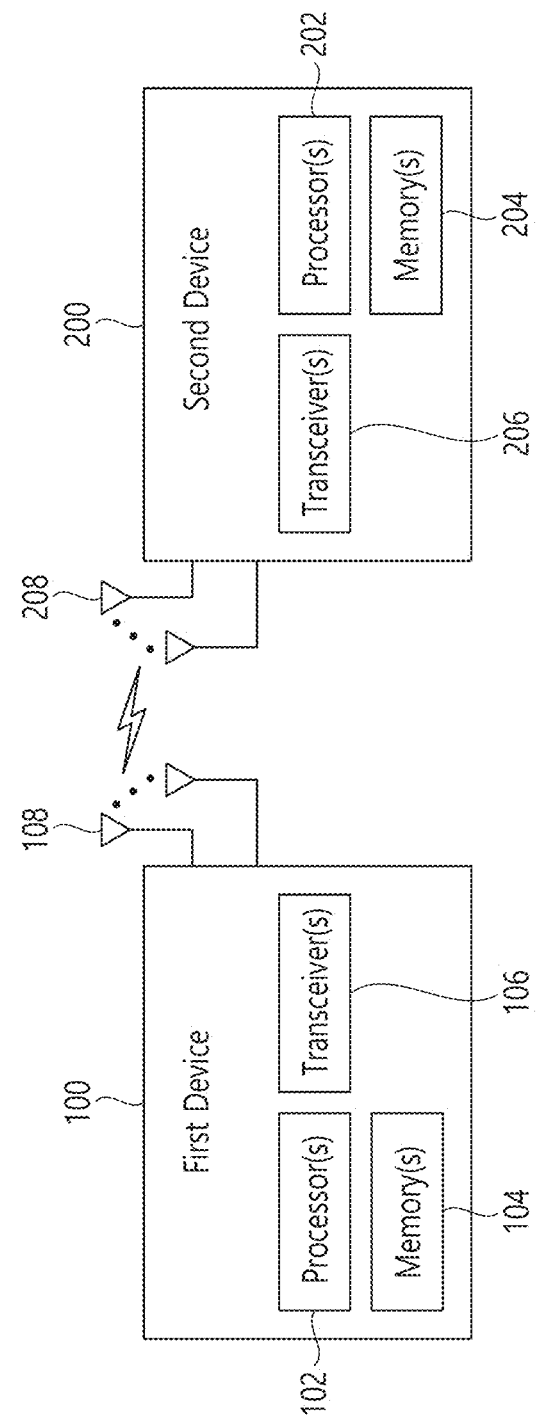
FIG. 18 shows wireless devices, in accordance with an embodiment of the present disclosure.

FIG. 18 shows wireless devices, in accordance with an embodiment of the present disclosure.

Referring to FIG. 18, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 17.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 19:
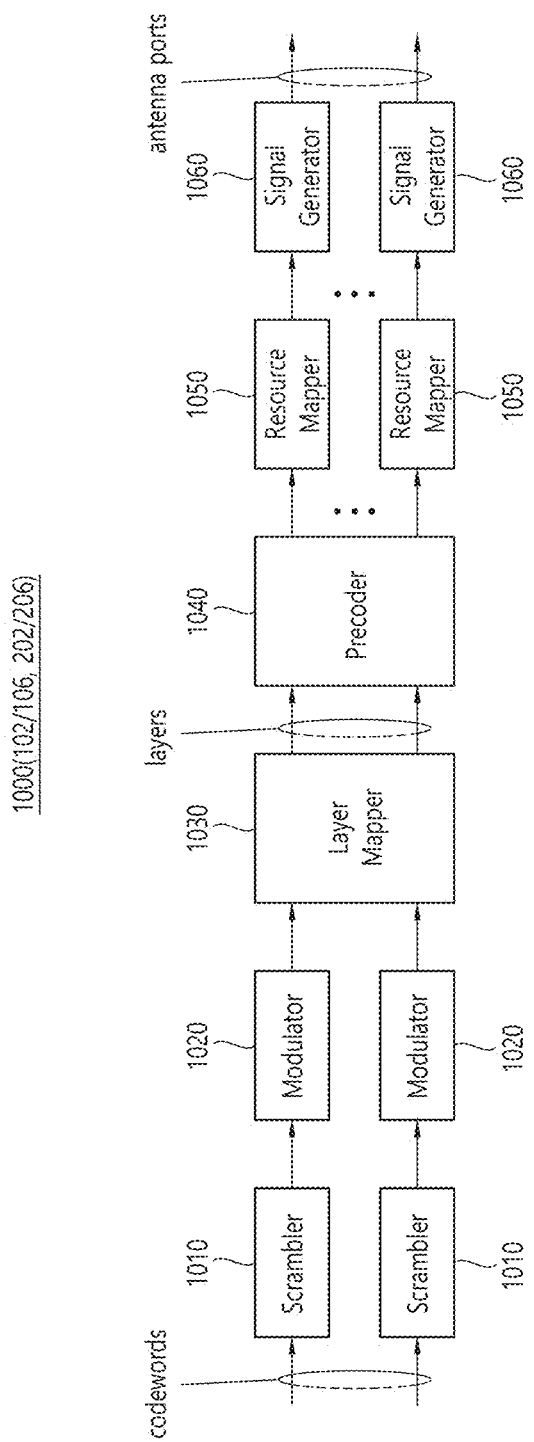
FIG. 19 shows a signal process circuit for a transmission signal, in accordance with an embodiment of the present disclosure.

FIG. 19 shows a signal process circuit for a transmission signal, in accordance with an embodiment of the present disclosure.

Referring to FIG. 19, a signal processing circuit 1000 may include scramblers 1010, modulators 1020, a layer mapper 1030, a precoder 1040, resource mappers 1050, and signal generators 1060. An operation/function of FIG. 19 may be performed, without being limited to, the processors 102 and 202 and/or the transceivers 106 and 206 of FIG. 18. Hardware elements of FIG. 19 may be implemented by the processors 102 and 202 and/or the transceivers 106 and 206 of FIG. 18. For example, blocks 1010 to 1060 may be implemented by the processors 102 and 202 of FIG. 18. Alternatively, the blocks 1010 to 1050 may be implemented by the processors 102 and 202 of FIG. 18 and the block 1060 may be implemented by the transceivers 106 and 206 of FIG. 18.

Codewords may be converted into radio signals via the signal processing circuit 1000 of FIG. 19. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers 1010. Scramble sequences used for scrambling may be generated based on an initialization value, and the initialization value may include ID information of a wireless device. The scrambled bit sequences may be modulated to modulation symbol sequences by the modulators 1020. A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper 1030. Modulation symbols of each transport layer may be mapped (precoded) to corresponding antenna port(s) by the precoder 1040. Outputs z of the precoder 1040 may be obtained by multiplying outputs y of the layer mapper 1030 by an N*M precoding matrix W. Herein, N is the number of antenna ports and M is the number of transport layers. The precoder 1040 may perform precoding after performing transform precoding (e.g., DFT) for complex modulation symbols. Alternatively, the precoder 1040 may perform precoding without performing transform precoding.

The resource mappers 1050 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 1060 may generate radio signals from the mapped modulation symbols and the generated radio signals may be transmitted to other devices through each antenna. For this purpose, the signal generators 1060 may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures 1010 to 1060 of FIG. 19. For example, the wireless devices (e.g., 100 and 200 of FIG. 18) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Figure 20:
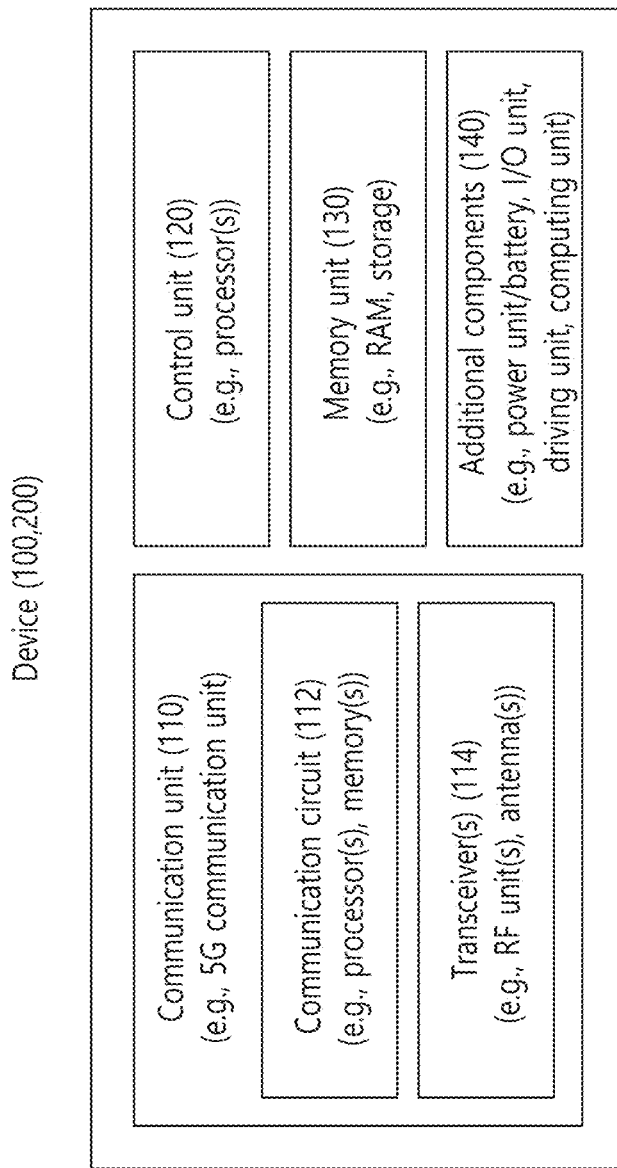
FIG. 20 shows a wireless device, in accordance with an embodiment of the present disclosure.

FIG. 20 shows another example of a wireless device, in accordance with an embodiment of the present disclosure. The wireless device may be implemented in various forms according to a use-case/service (refer to FIG. 17).

Referring to FIG. 20, wireless devices 100 and 200 may correspond to the wireless devices 100 and 200 of FIG. 18 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 18. For example, the transceiver(s) 114 may include the one or more transceivers 106 and 206 and/or the one or more antennas 108 and 208 of FIG. 18. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 17), the vehicles (100b-1 and 100b-2 of FIG. 17), the XR device (100c of FIG. 17), the hand-held device (100d of FIG. 17), the home appliance (100e of FIG. 17), the IoT device (100f of FIG. 17), a digital broadcast terminal, a hologram device, a public safety device, an MTC device, a medicine device, a fintech device (or a finance device), a security device, a climate/environment device, the AI server/device (400 of FIG. 17), the BSs (200 of FIG. 17), a network node, etc. The wireless device may be used in a mobile or fixed place according to a use-example/service.

In FIG. 20, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 20 will be described in detail with reference to the drawings.

Figure 21:
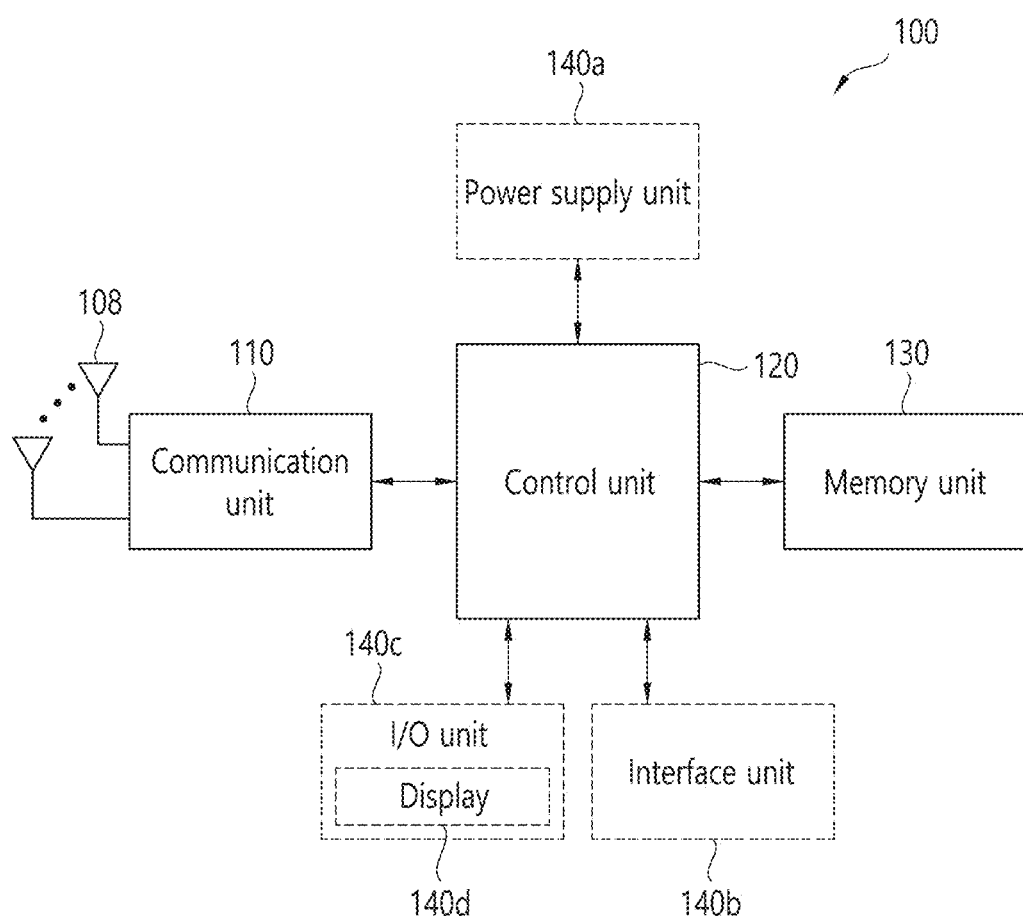
FIG. 21 shows a hand-held device, in accordance with an embodiment of the present disclosure.

FIG. 21 shows a hand-held device, in accordance with an embodiment of the present disclosure. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 21, a hand-held device 100 may include an antenna unit 108, a communication unit 110, a control unit 120, a memory unit 130, a power supply unit 140a, an interface unit 140b, and an I/O unit 140c. The antenna unit 108 may be configured as a part of the communication unit 110. Blocks 110 to 130/140a to 140c correspond to the blocks 110 to 130/140 of FIG. 20, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140*a* may supply power to the hand-held device 100 and include a wired/wireless charging circuit, a battery, etc. The interface unit 140*b* may support connection of the hand-held device 100 to other external devices. The interface unit 140*b* may include various ports (e.g., an audio I/O port and a video I/O port) for connection with external devices. The I/O unit 140*c* may input or output video information/signals, audio information/signals, data, and/or information input by a user. The I/O unit 140*c* may include a camera, a microphone, a user input unit, a display unit 140*d*, a speaker, and/or a haptic module.

As an example, in the case of data communication, the I/O unit 140*c* may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140*c*.

FIG. 22 shows a vehicle or an autonomous vehicle, in accordance with an embodiment of the present disclosure. The vehicle or autonomous vehicle may be implemented by a mobile robot, a car, a train, a manned/unmanned Aerial Vehicle (AV), a ship, etc.

Referring to FIG. 22, a vehicle or autonomous vehicle 100 may include an antenna unit 108, a communication unit 110, a control unit 120, a driving unit 140*a*, a power supply unit 140*b*, a sensor unit 140*c*, and an autonomous driving unit 140*d*. The antenna unit 108 may be configured as a part of the communication unit 110. The blocks 110/130/140*a* to 140*d* correspond to the blocks 110/130/140 of FIG. 20, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous vehicle 100. The control unit 120 may include an Electronic Control Unit (ECU). The driving unit 140*a* may cause the vehicle or the autonomous vehicle 100 to drive on a road. The driving unit 140*a* may include an engine, a motor, a powertrain, a wheel, a brake, a steering device, etc. The power supply unit 140*b* may supply power to the vehicle or the autonomous vehicle 100 and include a wired/wireless charging circuit, a battery, etc. The sensor unit 140*c* may acquire a vehicle state, ambient environment information, user information, etc. The sensor unit 140*c* may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140*d* may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140*d* may generate an autonomous driving path and a driving plan from the obtained data. The control unit 120 may control the driving unit 140*a* such that the vehicle or the autonomous vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140*c* may obtain a vehicle state and/or surrounding environment information. The autonomous driving unit 140*d* may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous vehicles and provide the predicted traffic information data to the vehicles or the autonomous vehicles.

Claims in the present description can be combined in a various way. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method.

What is claimed is:

1. A method for performing wireless communication by a first device, the method comprising:
   obtaining information related to a time division duplex (TDD) configuration;
   obtaining information related to a starting symbol of sidelink symbols and information related to a number of sidelink symbols;
   determining candidate resources to which a bitmap related to a sidelink resource pool is applied based on the information related to the TDD configuration;
   transmitting, to a second device, a sidelink-synchronization signal block (S-SSB),
   wherein the S-SSB includes a sidelink primary synchronization signal (S-PSS), a sidelink secondary synchronization signal (S-SSS) and a physical sidelink broadcast channel (PSBCH) including a TDD slot configuration; and
   transmitting, to the second device, a physical sidelink shared channel (PSSCH) based on information related to the TDD slot configuration in the PSBCH,
   wherein the sidelink resource pool includes a plurality of slots,
   wherein the starting symbol of the sidelink symbols included in each of the plurality of slots and the number of the sidelink symbols included in each of the plurality of slots are configured to be the same in the sidelink resource pool.

2. The method of claim 1, wherein the information related to the starting symbol of the sidelink symbols is in a form of a bit map.

3. The method of claim 2, wherein the bitmap is configured based on a symbol unit.

4. The method of claim 1, wherein resources for transmitting the S-SSB are pre-configured by a higher layer.

5. The method of claim 1, wherein resources for transmitting the S-SSB include resources in a frequency domain and a time domain.

6. The method of claim 1, wherein information related to a pre-configured sidelink resource pool by a higher layer is transmitted to the second device through the PSBCH.

7. The method of claim 6, wherein the information related to the pre-configured sidelink resource pool is in a form of a bit map.

8. The method of claim 1, wherein information on a sidelink slot or a sidelink symbol included in the sidelink resource pool among the information related to the TDD slot configuration is transmitted to the second device through the PSBCH.

9. The method of claim 8, wherein the information on the sidelink slot or the sidelink symbol included in the sidelink resource pool among the information related to the TDD slot configuration is in a form of a bit map.

10. The method of claim 9, wherein the bitmap is configured based on any one of a subframe unit, a slot unit, or a symbol unit.

11. The method of claim 1, wherein the sidelink resource pool is configured based on the candidate resources.

12. The method of claim 11, wherein resources for transmitting the S-SSB is not included in the sidelink resource pool.

13. A first device for performing wireless communication, the first device comprising:
   one or more memories storing instructions;
   one or more transceivers; and
   one or more processors connected to the one or more memories and the one or more transceivers, wherein the one or more processors execute the instructions to:
   obtain information related to a time division duplex (TDD) configuration,
   obtain information related to a starting symbol of sidelink symbols and information related to a number of sidelink symbols,
   determine candidate resources to which a bitmap related to a sidelink resource pool is applied based on the information related to the TDD configuration,
   transmit, to a second device, a sidelink-synchronization signal block (S-SSB),
   wherein the S-SSB includes a sidelink primary synchronization signal (S-PSS), a sidelink secondary synchronization signal (S-SSS) and a physical sidelink broadcast channel (PSBCH) including a TDD slot configuration,
   transmit, to the second device, a physical sidelink shared channel (PSSCH) based on information related to the TDD slot configuration in the PSBCH,
   wherein the sidelink resource pool includes a plurality of slots, and
   wherein the starting symbol of the sidelink symbols included in each of the plurality of slots and the number of the sidelink symbols included in each of the plurality of slots are configured to be the same in the sidelink resource pool.

14. The first device of claim 13, wherein the information related to the starting symbol of the sidelink symbols is in a form of a bit map.

15. A method for performing wireless communication by a second device, the method comprising:
   receiving, from a first device, a sidelink-synchronization signal block (S-SSB),
   wherein the S-SSB includes a sidelink primary synchronization signal (S-PSS), a sidelink secondary synchronization signal (S-SSS) and a physical sidelink broadcast channel (PSBCH) including a time division duplex (TDD) slot configuration; and
   receiving, from the first device, a physical sidelink shared channel (PSSCH) based on the information related to the TDD slot configuration in the PSBCH,
   wherein information related to a TDD configuration is obtained,
   wherein information related to a starting symbol of sidelink symbols and information related to a number of sidelink symbols is obtained,
   wherein candidate resources to which a bitmap related to a sidelink resource pool is applied are configured based on the information related to the TDD configuration,
   wherein the sidelink resource pool includes a plurality of slots, and
   wherein the starting symbol of the sidelink symbols included in each of the plurality of slots and the number of the sidelink symbols included in each of the plurality of slots are configured to be the same in the sidelink resource pool.

* * * * *